(12) United States Patent
Morisawa et al.

(10) Patent No.: US 7,809,459 B2
(45) Date of Patent: Oct. 5, 2010

(54) ADVANCED-PROCESS-CONTROL SYSTEM UTILIZING A LAMBDA TUNER

(75) Inventors: Toshihiro Morisawa, Kanagawa (JP); Andrew C. Walker, Carmel, CA (US); Yeak-Chong Wong, San Jose, CA (US)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 452 days.

(21) Appl. No.: 12/006,411

(22) Filed: Dec. 31, 2007

(65) Prior Publication Data

US 2009/0171638 A1    Jul. 2, 2009

(51) Int. Cl.
G06F 19/00 (2006.01)
G06F 17/10 (2006.01)
G05B 13/02 (2006.01)

(52) U.S. Cl. .......................... 700/109; 700/29; 700/33; 700/51; 703/2; 702/179

(58) Field of Classification Search ............. 700/28–33, 700/37, 44, 47, 49, 51, 52, 95, 97, 103, 104, 700/105, 108–110, 121, 173, 174; 703/2; 702/81, 82, 84, 179
See application file for complete search history.

(56) References Cited

U.S. PATENT DOCUMENTS

| | | | |
|---|---|---|---|
| 6,453,219 B1 * | 9/2002 | Kazmierowicz et al. ..... 700/299 |
| 6,607,926 B1 | 8/2003 | Toprac et al. | |
| 6,711,514 B1 * | 3/2004 | Bibbee ...................... 702/84 |
| 2004/0064817 A1 * | 4/2004 | Shibayama et al. ......... 718/104 |

FOREIGN PATENT DOCUMENTS

| | | |
|---|---|---|
| JP | 62231306 | 10/1987 |
| JP | 04367901 | 12/1992 |
| JP | 09070607 | 3/1997 |
| JP | 10031505 | 2/1998 |
| JP | 2003330913 | 11/2003 |

OTHER PUBLICATIONS

Patel, et al., "Adaptive Optimization of Run-to-Run Controllers: The EWMA Example", *IEEE Transactions on Semiconductor Engineering*, vol. 13, No. 1, (Feb. 2000),97-107.

* cited by examiner

*Primary Examiner*—Sean P Shechtman

(57) ABSTRACT

An advanced process control (APC) system. The APC system comprises a database for receiving process data from a measurement tool for a plurality of process runs and for storing the process data. A lambda tuner determines a tuned-lambda value corresponding to a process-capability-index value based on upper and lower process control limits and statistics derived from the process data. A process-run controller updates a recipe value based on the received process data and the tuned-lambda value.

16 Claims, 20 Drawing Sheets

1200

EXECUTE A RUN-TO-RUN-SIMULATION APPLIED TO THE PROCESS DATA, A PROCESS-EQUIPMENT-OUTPUT MODEL, AND PROCESS-EQUIPMENT-OUTPUT-MODEL COEFFICIENTS TO SIMULATE THE PROCESS-EQUIPMENT-OUTPUT VALUES, $y^*_{ij}$, AS A FUNCTION OF THE LAMBDA VALUES, $\lambda_i$
1210

1300

CALCULATE THE STATISTICS FROM THE PROCESS-EQUIPMENT-OUTPUT VALUES, $y^*_{ij}$, AND CALCULATE THE PROCESS-CAPABILITY-INDEX VALUES, $C_{pk\,i}$, FROM THE STATISTICS AS A FUNCTION OF THE LAMBDA VALUES, $\lambda_i$
1310

SELECT AS THE TUNED-LAMBDA VALUE, $\lambda_{TUNED}$, A SELECTED LAMBDA VALUE, $\lambda_S$, CORRESPONDING TO A SELECTED PROCESS-CAPABILITY-INDEX VALUE, $C_{pk\,S}$, IN A PLURALITY OF THE PROCESS-CAPABILITY-INDEX VALUES, $C_{pk\,i}$
1320

SYNTHESIZE SYNTHETIC PROCESS DATA COMPRISING A WAVEFORM AS A FUNCTION OF RUN TIME SELECTED FROM THE GROUP OF WAVEFORMS CONSISTING OF: A RAMP, INDEPENDENTLY AND IDENTICALLY DISTRIBUTED DATA, BROWN NOISE, A PERIODICALLY REPEATING STEP, A SINE WAVE, PERIODICALLY REPEATING IMPULSE, A SAWTOOTH, AND A CONSTANT LEVEL
1810

FIG. 18

ADVANCED-PROCESS-CONTROL SYSTEM UTILIZING A LAMBDA TUNER

TECHNICAL FIELD

Embodiments of the present invention relate generally to the field of advanced-process-control (APC) systems for a manufacturing line.

BACKGROUND

Contemporary manufacturing facilities produce products that are often fabricated with numerous and complicated processes. Each process often performed on sophisticated process-equipment tools. Also, at various points in fabrication, the product is characterized with measurement tools to assure that it is within specified tolerances to maintain its quality.

In particular, the manufacture of electronic components involves the application of multiple processes requiring exacting control. To maintain quality, elaborate statistical process control schemes have been developed to keep manufacturing processes used to fabricate electronic components within specified tolerances. These schemes utilize a feedback loop between measured parameters of the product and the settings of the process-equipment tools used in fabrication. However, existing statistical process control schemes may lack the speed and complexity required to take full advantage of process yield improvements that can be provided by thorough-going analysis of the process data provided by these measurement tools.

SUMMARY

Embodiments of the present invention comprise an advanced process control (APC) system. The APC system comprises a database for receiving process data from a measurement tool for a plurality of process runs and for storing the process data. A lambda tuner determines a tuned-lambda value corresponding to a process-capability-index value based on upper and lower process control limits and statistics derived from the process data. A process-run controller updates a recipe value based on the received process data and the tuned-lambda value.

DESCRIPTION OF THE DRAWINGS

The accompanying drawings, which are incorporated in and form a part of this specification, illustrate embodiments of the invention and, together with the description, serve to explain the embodiments of the invention:

FIG. 13 is a flow chart illustrating an embodiment of the present invention for calculating a tuned-lambda-value of the method for advanced process control.

FIG. 18 is a flow chart illustrating an embodiment of the present invention for synthesizing synthetic process data of the method for advanced process control.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention.

Figure 1:
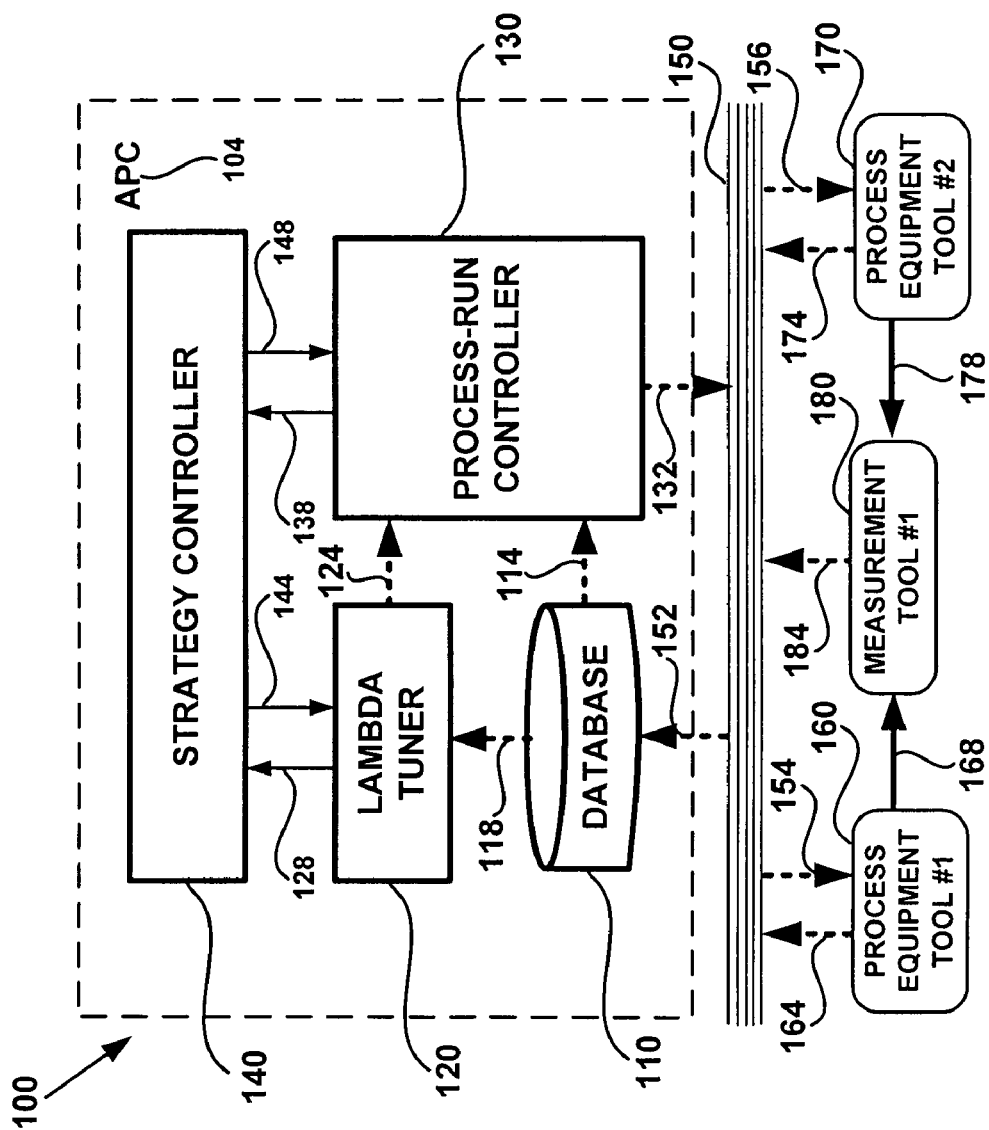
FIG. 1 is schematic diagram illustrating an APC system utilizing a lambda tuner for an embodiment of the present invention.

Physical Description of Embodiments of the Present Invention for an Advanced Process Control System With reference to FIG. 1, in accordance with an embodiment of the present invention 100, an APC system 104 utilizing a lambda tuner 120 is shown. The APC system 104 provides advanced-process control to a manufacturing process line comprising process-equipment tools, e.g. process-equipment tool #1 160, and process-equipment tool #2 170, as shown. In one implementation of a manufacturing line, process control information may be passed to and from the APC system 104 on a data bus 150 through data links, e.g. 154 and 156 to the process-equipment tools 160 and 170. Process data from the process-equipment tools can also be sent back to the APC system 104 via the data bus 150 through data links, e.g. 164 and 174; process data comprising measurements of process-equipment outputs may be sent by measurement tools via data links, e.g. measurement tool #1 180 via a data link 184, as shown. To obtain measurements of process-equipment outputs, it is usually necessary, as in the case of a measurement tool that is separate from a process-equipment tool, to transfer product at some point in the manufacturing process from a process-equipment tool to a measurement tool, e.g. physical transfers 168 and 178 from process-equipment tools 160 and 170 to measurement tool #1 180, as shown. However, it should be recognized that a measurement tool integrated with a process-equipment tool is within the spirit of embodiments of the present invention.

A typical manufacturing line might employ, for example, one or more of the following: a thin film sputtering tool, an ion milling tool, a plating tool and a photo-lithographic stepper, as a process-equipment tool for manufacturing product comprising, for example, wafers comprising magnetic recording heads, or integrated circuits. In addition, a typical manufacturing line might also employ, for example, one or more of the following: a focused ion beam (FIB) tool, a scanning electron microscope (SEM), an ellipsometer, or other defect review tool (DRT), as a measurement tool. Similarly, it should be recognized that embodiments of the present invention are not limited to the tools and products recited above, but that other tool sets and products are within the spirit of embodiments of the present invention.

A described above, the manufacturing line comprises a first portion of a feedback loop connected to a first data channel 152 that serves as an input port to the APC system 104 and a fifth data channel 132 that serves as an output port from the APC system 104, and the APC system 104, itself, comprises a second portion of the feedback loop in which information concerning the manufacturing process flows. The feedback loop comprises a coupled feedback system comprising the APC system 104 and the manufacturing line. The information flowing in the feedback loop is used to control the quality of product being manufactured on the manufacturing line, the amount of product flowing through the manufacturing line, and a plurality of other process-flow metrics. As shown in FIG. 1, the information flowing in the feedback loop flows along the heavy dashed lines of data links and data channels of the manufacturing line and the APC system 104. One form of information that is input to the APC system 104 is a measurement of a process-equipment output, y, for example, one or more of the following: the thickness of a thin film layer on a wafer, the degree of misregistration or registration of a thin film layer associated with a first mask with a thin film layer associated with a second mask, the resistivity of a thin film, the giant magnetoresistance of a magnetic recording sensor, or the coercivity of a magnetic thin film. One form of information that is output from the APC system 104 is a recipe value, $u_{OUT}$, for example, one or more of the following: a deposition time for depositing a thin film, a required registration tolerance for aligning masks associated with various thin film layers on a wafer, a curing time for baking a photoresist layer, or a coercivity limit for a magnetic thin film.

With further reference to FIG. 1, the APC system 104 comprises three basic component blocks: a database 110, a lambda ($\lambda$) tuner 120, and a process-run controller 130. These component blocks form the core of the second portion of the feedback loop comprising the APC system 104 and are connected to various data channels: the first data channel 152 that serves as the input port for process data to the database 110 of the APC system 104, a second data channel 114 that serves to transmit process data from the database 110 to the process-run controller 130, a third data channel 118 that serves to transmit process data from the database 110 to the lambda tuner 120, a fourth data channel 124 to transmit a tuned-lambda value, $\lambda_{TUNED}$, from lambda tuner 120 to the process-run controller 130, and the fifth data channel 132 that serves as the output port from the process-run controller 130 of the APC system 104.

With further reference to FIG. 1, the APC system 104 comprises the database 110 for receiving process data from the measurement tool #1 180 for a plurality of process runs and storing the process data. The APC system 104 also comprises the lambda tuner 120 for determining a tuned-lambda value, $\lambda_{TUNED}$, corresponding to a process-capability-index value, $C_{pk\,i}$, based on upper and lower process control limits and statistics derived from the process data. In addition, the APC system 104 comprises the process-run controller 130 for updating the recipe value, $u_{OUT}$, based on the process data and the tuned-lambda value, $\lambda_{TUNED}$, and for outputting the updated recipe value, $u_{OUT}$, to a process-equipment tool, for example, process-equipment tool #1 160 and/or process-equipment tool #2 170.

In accordance with another embodiment of the present invention, the APC system 104 further comprises a strategy controller 140 for sending strategy-control information to the lambda tuner 120 and the process-run controller 130. The strategy controller 140 is connected to a sixth data channel 144 for sending strategy-control information to the lambda tuner 120; and, the strategy controller 140 is also connected to a seventh data channel 128 for receiving information from the lambda tuner 120. In addition, the strategy controller 140 is connected to an eighth data channel 148 for sending strategy-control information to the process-run controller 130; and, the strategy controller 140 is also connected to a ninth data channel 138 for receiving information from the process-run controller 130.

In accordance with embodiment of the present invention, the strategy-control information sent to the process-run controller 130 and the lambda tuner 120 comprises a process-equipment-model selection command, a process-equipment-output target value, $y^{TARGET}$, and initial values for a variety of control parameters used by the lambda tuner 120 and the process-run controller 130, including an initial lambda value. In addition, the strategy-control information sent to the lambda tuner 120 further comprises a simulation-mode selection command. The information sent to the strategy controller 140 from the lambda tuner 120 includes run-to-run simulation data; and, information sent to the strategy controller 140 from the process-run controller 130 includes process-data, control-chart information. Moreover, the strategy controller 140 further comprises a human-machine interface to the APC system 104 for receiving instructions from a system operator to send strategy-control information to the lambda tuner 120 and the process-run controller 130 and for communicating information sent from the lambda tuner 120 and the process-run controller 130 to a system operator.

Figure 2:
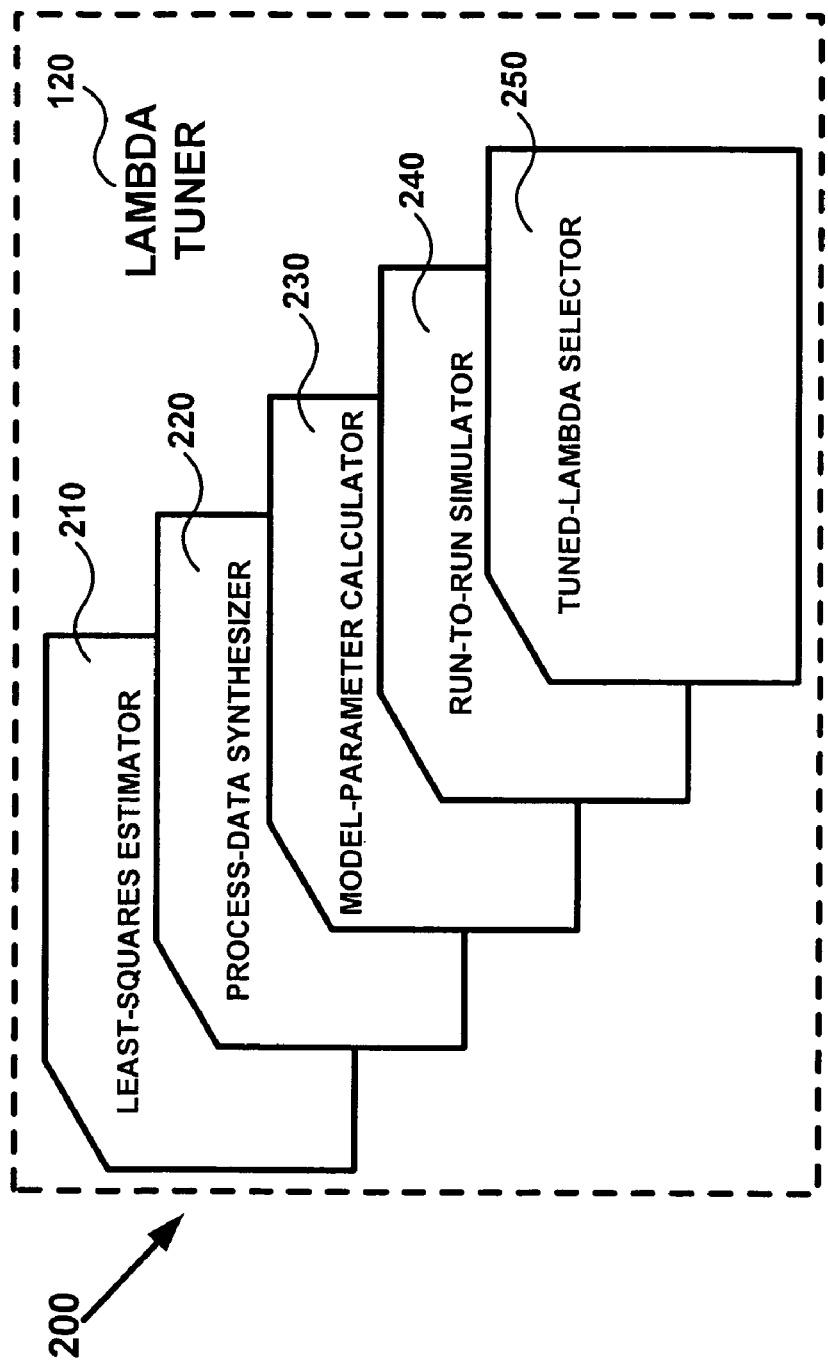
FIG. 2 is schematic diagram illustrating component blocks of a lambda tuner for an embodiment of the present invention.

With reference now to FIG. 2, in accordance with an embodiment of the present invention 200, the lambda tuner 120 further comprises various component modules: a least-squares estimator 210, a process-data synthesizer 220, a model-parameter calculator 230, a run-to-run simulator 240, and a tuned-lambda selector 250. Although these component modules are shown as component modules of the lambda tuner 120, it should be recognized that their accessibility by other component blocks of the APC system 104, and even the incorporation of these component modules into other component blocks of the APC system 104, e.g. the process-run controller 130 and/or the strategy controller 140, or their embodiment as separate independent component blocks of the APC system 104 are not precluded by the embodiment of the invention shown in FIG. 2, and are within the scope of embodiments contemplated for the present invention. Rather, as for a mode of implementation of embodiments of the present invention as programmable instructions of a computer system, these component modules may be located in various modules of a computer system, or even distributed amongst various modules of a computer system configured to execute those programmable instructions, as is well known from the computer art. Nevertheless, the embodiment of the present invention shown in FIG. 2 provides a convenient schematic representation. It should be recognized that the schematic representation shown in FIG. 2 does not preclude embodiments of the present invention in hardware, software, firmware or any combination thereof.

With further reference to FIG. 2, the least-squares estimator 210 utilizes a process-equipment-output model given by:

$$y = a_0 + a_1 ux + b_0 + b_1 v$$

where y is a process-equipment output, $a_0$, $a_1$, $b_0$, and $b_1$ are process-equipment-model coefficients, u is a recipe for a process, x is a process-equipment-state, model parameter, and v is a process-equipment-disturbance, model parameter. Upon rearrangement of the terms, the process-equipment-output model provides a recipe model given by:

$$u = (y^{TARGET} - (a_0 + b_0 + b_1 v))/(a_1 x)$$

where $y^{TARGET}$ is a process-equipment-output target value sent by the strategy controller 140. The process-equipment-output model and the recipe model are accessible to various component blocks of the APC system 104, e.g. the process-run controller 130 and the lambda tuner 120, and their respective component modules.

Depending on the manner in which these models are employed, the process-equipment output, y, may be selected from the group consisting of true process-equipment output, $y^{TRUE}$, provided by past process data and recent process data measured by a measurement tool, e.g. measurement tool #1 180; process data is selected from this group in response to a process-simulation-mode selection command sent from the strategy controller 140. Likewise, a process-equipment-state, model parameter, x, may be selected from the group consisting of an actual process-equipment-state, model parameter, x*, an estimated process-equipment-state, model parameter, x^, and a true process-equipment-state, model parameter, $x^{TRUE}$. Similarly, a process-equipment-disturbance, model parameter, v, may be selected from the group consisting of an actual process-equipment-disturbance, model parameter, v*, an estimated process-equipment-disturbance, model parameter, v^, and a true process-equipment-disturbance, model parameter, $v^{TRUE}$. Also, the process-equipment-model coefficients may be selected from the group consisting of true process-equipment-model coefficients: $a_0^{TRUE}$, $a_1^{TRUE}$, $b_{0TRUE}$, and $b_1^{TRUE}$, having a value selected from 1 and 0 in response to a process-equipment-model selection command, and nominal process-equipment-model coefficients: $a_0^{NOMINAL}$, $b_0^{NOMINAL}$, $b_1^{NOMINAL}$, and $a_1^{NOMINAL}$. The least-squares estimator 210 determines the nominal process-equipment-model coefficients by fitting true process-equipment output values, $y_i^{TRUE}$, to the process-equipment-output model using the true process-equipment-state, model-parameter values, $x_i^{TRUE}$, and the true process-equipment-disturbance, model-parameter values, $v_i^{TRUE}$.

As used herein, parameters and coefficients will be distinguished from values of these parameters and coefficients by the use of a subscript index, i, j, or k. Also, TRUE values appear in an actual phenomenon as either process data provided by a measurement tool, e.g. measurement tool #1 180, or provided by synthetic process data synthesized by the process-data synthesizer 220. As will become evident from the subsequent description, NOMINAL values are used to calculate the following: the recipe, u, the process-equipment-state, model parameter, x, and the process-equipment-disturbance, model parameter, v. Values usually used in the APC system 104 are NOMINAL values. It should be recognized that in the case where the values derived from experiments are sufficiently correct, or there is no way to determine TRUE values, the TRUE values may be set the same as the NOMINAL values. In addition, the superscript, ^, is used to designate estimated values of the process-equipment-state, model parameter, x, and the process-equipment-disturbance, model parameter, v; and the superscript, *, is used to designate actual values of the process-equipment output, y*, process-equipment-state, model parameter, x*, and the process-equipment-disturbance, model parameter, v*. Actual values, as used herein, correspond to simulated values of parameters and output that result from simulations performed by embodiments of the present invention. Also, unless otherwise indicated, process-equipment output, as used herein, means actual process equipment output, y*.

With further reference to FIG. 2, in accordance with the embodiment of the present invention 200, the process-data synthesizer 220 for synthesizing synthetic process data in an automatic generation mode may be used to generate synthetic process data for use as true process-equipment-state, model-parameter values, $x_i^{TRUE}$, and the true process-TRUE equipment-disturbance, model-parameter values, $v_i^{TRUE}$. The synthetic process data comprises a waveform as a function of run time selected from the group of waveforms consisting of: a ramp, independently and identically distributed data, brown noise, a periodically repeating step, a sine wave, a periodically repeating impulse, a sawtooth, and a constant level. The process-data synthesizer 220 provides a synthetic process data generation function that is effective in testing process-equipment-output model settings. Furthermore, the synthetic process data generation function provided by the process-data synthesizer 220 is also effective in examination of the process-equipment-output model at the stage of pre-deployment of an actual manufacturing process.

With further reference to FIG. 2, in accordance with the embodiment of the present invention 200, the model-parameter calculator 230 may be used in a data referencing mode using actual process data to determine the true process-equipment-state, model-parameter values, $x_i^{TRUE}$, and the true process-equipment-disturbance, model-parameter values, $v_i^{TRUE}$, that are derived from true process-equipment output values (actual process results), $y_i^{TRUE}$. If the true process-equipment output values, $y_i^{TRUE}$, may be acquired, lambda values, $\lambda_i$, may be verified using the true process-equipment-state, model-parameter values, $x_i^{TRUE}$, and the true process-equipment-disturbance, model-parameter values, $v_i^{TRUE}$, which cannot be produced using the process-data synthesizer 220 in an automatic generation mode. Thus, process-equipment-output models may be examined under the resulting complex patterns of the true process-equipment-state, model-parameter values, $x_i^{TRUE}$, and the true process-equipment-disturbance, model-parameter values, $v_i^{TRUE}$.

With further reference to FIG. 2, in accordance with the embodiment of the present invention 200, the run-to-run simulator 240 may be used for simulating process-equipment-output values, $y_i$. The run-to-run simulator 240 is applied to process data, a process-equipment-output model, and process-equipment-model coefficients for simulating the process-equipment-output values, $y_i$, and for providing to the lambda tuner 120 a plurality of lambda values, $\lambda_i$, and corresponding process-equipment-output values, $\lambda_i$, for a plurality of simulated process runs.

Figure 3A:
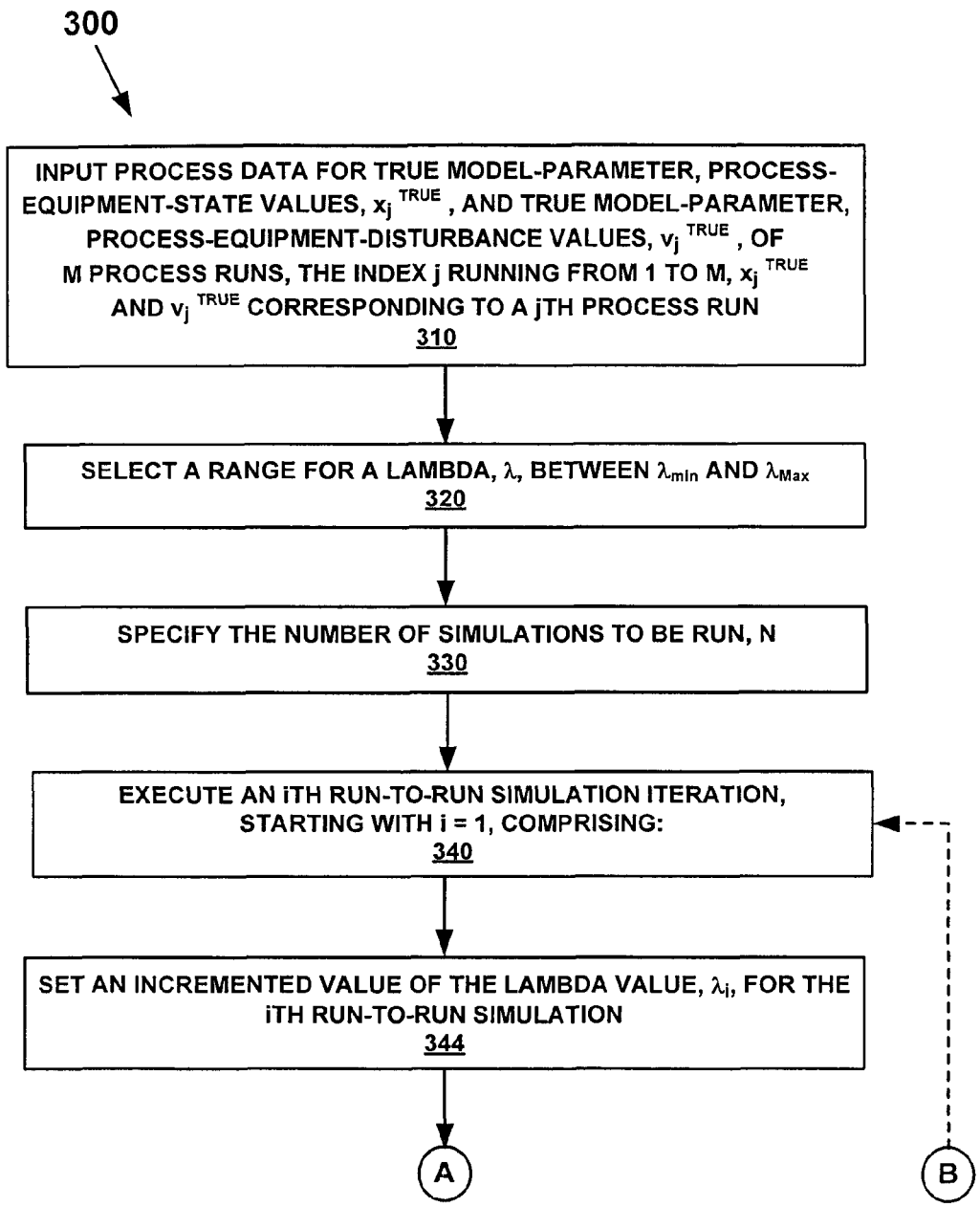
FIGS. 3A and 3B are a flow chart illustrating instructions performed by a run-to-run simulator for an embodiment of the present invention.
Figure 3B:
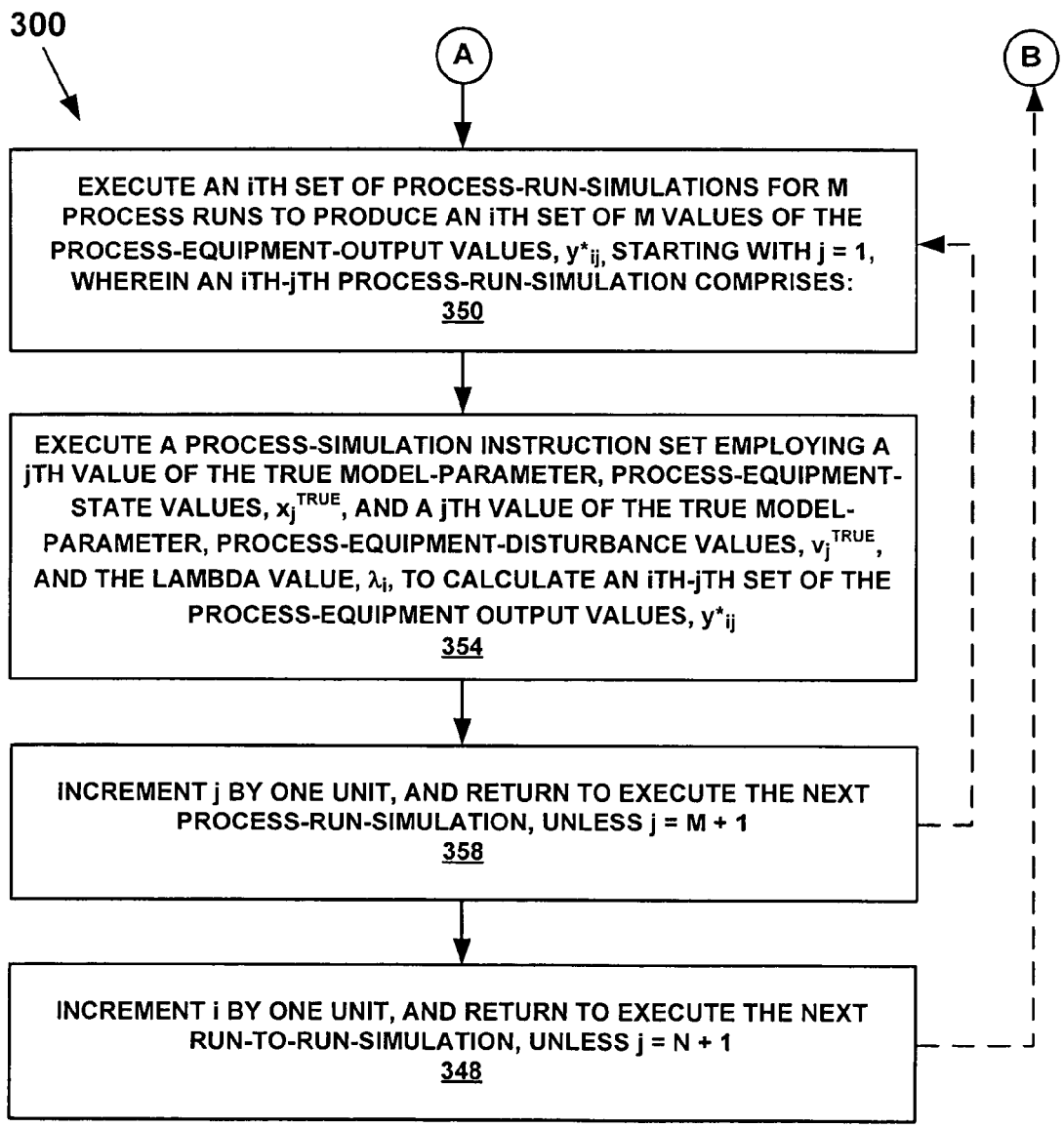

With reference to FIGS. 3A and 3B, in accordance with an embodiment of the present invention 300, the run-to-run simulator 240 executes a run-to-run-simulation instruction set. The run-to-run-simulation instruction set comprises: 310 inputting process data for true process-equipment-state, model-parameter values, $x_j^{TRUE}$, and true process-equipment-disturbance, model-parameter values, $v_j^{TRUE}$, of M process runs, the index j running from 1 to M, $x_j^{TRUE}$ and $v_j^{TRUE}$ corresponding to a jth process run; 320 selecting a range for lambda, $\lambda$, between $\lambda_{min}$ and $\lambda_{max}$; 330 specifying a number of run-to-run simulations to be run, N; 340 executing an ith run-to-run simulation, starting with i=1, comprising: 344 setting an incremented value of the lambda value, $\lambda_i$, for the ith run-to-run simulation; 350 executing an ith set of process-run-simulations for M process runs to produce an ith set of M values of the process-equipment-output values, $y^*_{ij}$, starting with j=1, wherein an ith-jth process-run-simulation comprises: 354 executing a process-run-simulation instruction set employing a jth value of the true process-equipment-state, model-parameter values, $x_j^{TRUE}$, and a jth value of the true process-equipment-TRUE disturbance, model-parameter values, $v_j^{TRUE}$, and the lambda value, $\lambda_i$, to calculate an ith-jth value of the process-equipment-output values, $y^*_{ij}$; 358 incrementing, by one unit, and returning to execute a next process-run-simulation, unless j=M+1; and 348 incrementing i by one unit, and returning to execute a next run-to-run simulation, unless i=N+1.

With further reference to FIGS. 3A and 3B, in accordance with the embodiment of the present invention 300, the run-to-run-simulation instruction 320 further comprises: selecting a range for lambda, $\lambda$, between $\lambda_{min}$ and $\lambda_{max}$, where $\lambda_{min}$ and $\lambda_{max}$ are between 0 and 2, and $\lambda_{max} > \lambda_{min}$; specifying the number of simulations to be run, N, given by:

$$(\lambda_{max} - \lambda_{min})/\Delta_\lambda + 1$$

wherein $\Delta_\lambda$ is an increment to the lambda value, $\lambda_i$; and setting an incremented value of lambda value, $\lambda_i = \lambda_{min} + (i-1)\Delta_\lambda$, for the ith simulation, wherein i is the number of the simulation in the range of 1 to N.

Figure 4A:
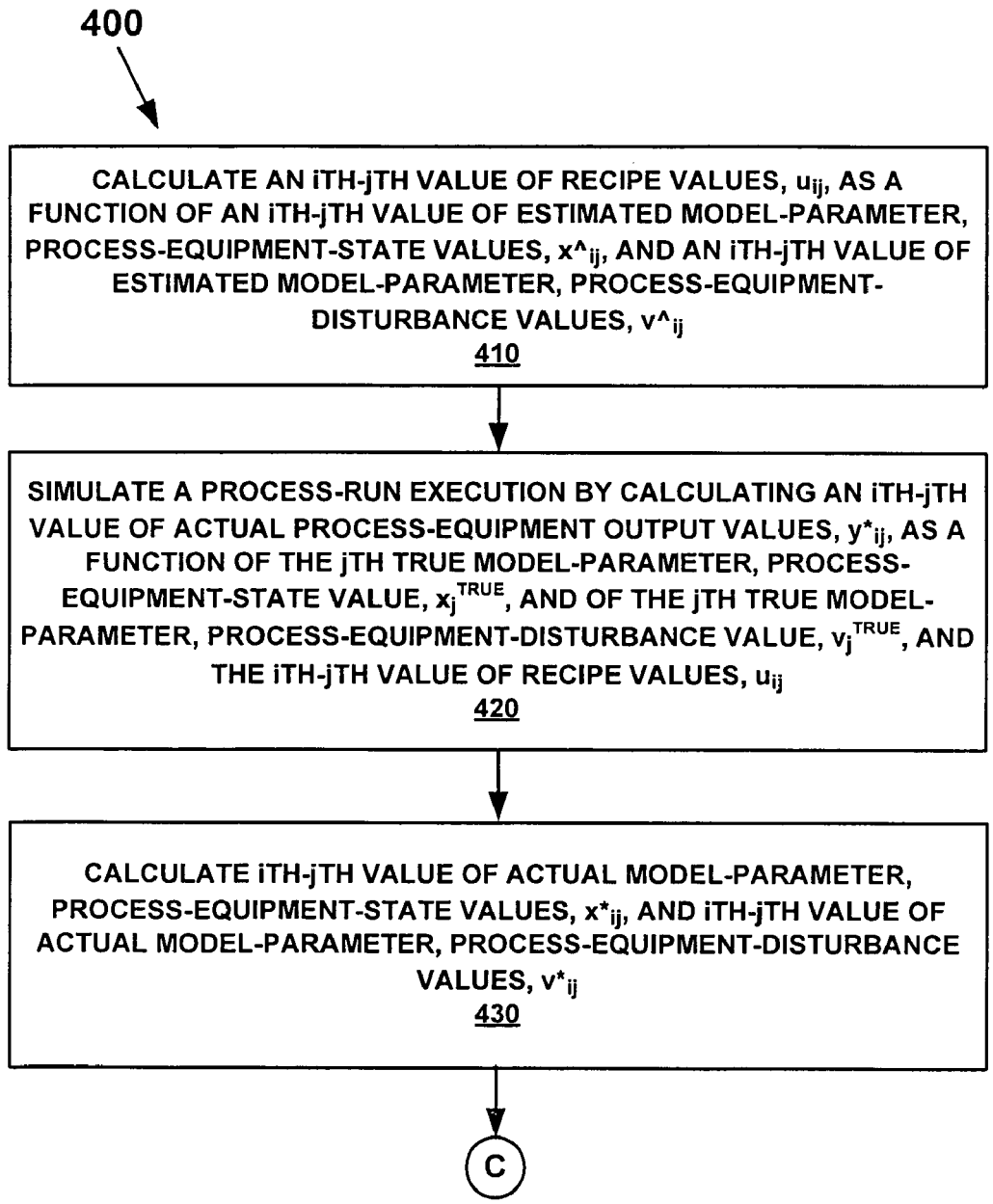
FIGS. 4A and 4B are a flow chart illustrating instructions performed by a process simulation for an embodiment of the present invention.
Figure 4B:
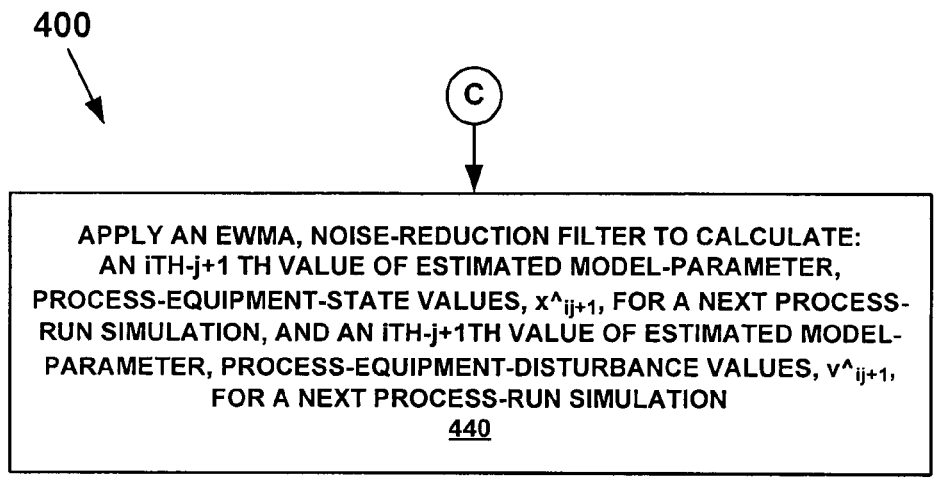

With reference to FIGS. 4A and 4B, in accordance with an embodiment of the present invention 400, the run-to-run-simulation instruction 354 for executing a process-simulation instruction set for the ith-jth process-run-simulation of M process runs further comprises: 410 calculating an ith-jth value of recipe values, $u_{ij}$, as a function of an ith-jth value of estimated process-equipment-state, model-parameter values, $\hat{x}_{ij}$, and an ith-jth value of estimated process-equipment-disturbance, model-parameter values, $\hat{v}_{ij}$; 420 simulating a process-run execution by calculating the ith-jth value of process-equipment-output values, $y^*_{ij}$, as a function of the jth value of the true process-equipment-state, model-parameter values, $x_j^{TRUE}$, and of the jth value of the true process-equipment-disturbance, model-parameter values, $v_j^{TRUE}$, and the ith-jth value of recipe values, $u_{ij}$; 430 calculating an ith-jth value of actual process-equipment-state, model-parameter values, $x^*_{ij}$, and an ith-jth value of actual process-equipment-disturbance, model-parameter values, $v^*_{ij}$; and 440 applying an exponentially-weighted-moving-average (EWMA), noise-reduction filter to calculate: an ith-j+1 th value of estimated process-equipment-state, model-parameter values, $\hat{x}_{i,j+1}$, for a next process-run simulation, and an ith-j+1th value of estimated process-equipment-disturbance, model-parameter values, $\hat{v}_{i,j+1}$, for a next process-run simulation.

With further reference to FIGS. 4A and 4B, in accordance with the embodiment of the present invention 400, the process-simulation instruction 410 further comprises calculating an ith-jth value of recipe values, $u_{ij}$, given by:

$$u_{ij} = (y^{TARGET} - (a_0^{NOMINAL} + b_0^{NOMINAL} b_1^{NOMINAL} \hat{v}_{ij})) 9 a_1^{NOMINAL} \hat{x}_{ij}).$$

The process-simulation instruction 420 further comprises calculating an ith-jth value of process-equipment-output values, $y^*_{ij}$, given by:

$$y^*_{ij} = a_0^{TRUE} + a_1^{TRUE} u_{ij} \hat{x}_{ij} + b_0^{TRUE} + b_1^{TRUE} \hat{v}_{ij} + \text{NOISE},$$

where NOISE is a normal random number produced by a normally-distributed-random-number generator. The process-simulation instruction 430 further comprises calculating an ith-jth value of actual process-equipment-state, model-parameter values, $x^*_{ij}$, given by:

$$x^*_{ij} = (y^*_{ij} - (a_0^{NOMINAL} + b_0^{NOMINAL} + b_1^{NOMINAL} v_{ij}^{TRUE}))/(a_1^{NOMINAL} u_{ij});$$

and calculating an ith-jth value of actual process-equipment-disturbance, model-parameter values, $v^*_{ij}$, given by:

$$v^*_{ij} = (y^*_{ij} - (a_0^{NOMINAL} + a_1^{NOMINAL} u_{ij} x_{ij}^{TRUE} + b_0^{NOMINAL}))/b_1^{NOMINAL}.$$

The process-simulation instruction 440 further comprises applying an EWMA, noise-reduction filter to calculate an ith-j+1th value of estimated process-equipment-state, model-parameter values, $\hat{X}_{i,j+1}$, for a next process-run simulation given by:

$$\hat{x}_{i,j+1} = \lambda_i x^*_{ij} + (1-\lambda_i) \hat{x}_{ij}$$

and an ith-j+1th value of estimated a next estimated process-equipment-disturbance, model-parameter values, $\hat{v}_{i+1}$, given by:

$$\hat{v}_{i,j+1} = \lambda_i v^*_{ij} + (1-\lambda_i) \hat{v}_{ij}.$$

The ith-j+1th value of estimated process-equipment-disturbance, model-parameter values, $\hat{v}_{i+1}$, and the ith-j+1th value of estimated process-equipment-state, model-parameter values, $\hat{x}_{i,j+1}$, serve as a next estimated process-equipment-state, model-parameter value, and next estimated process-equipment-disturbance, model-parameter value to be input for the estimated values of these parameters in a next iteration of the process-run simulation.

Figure 5:
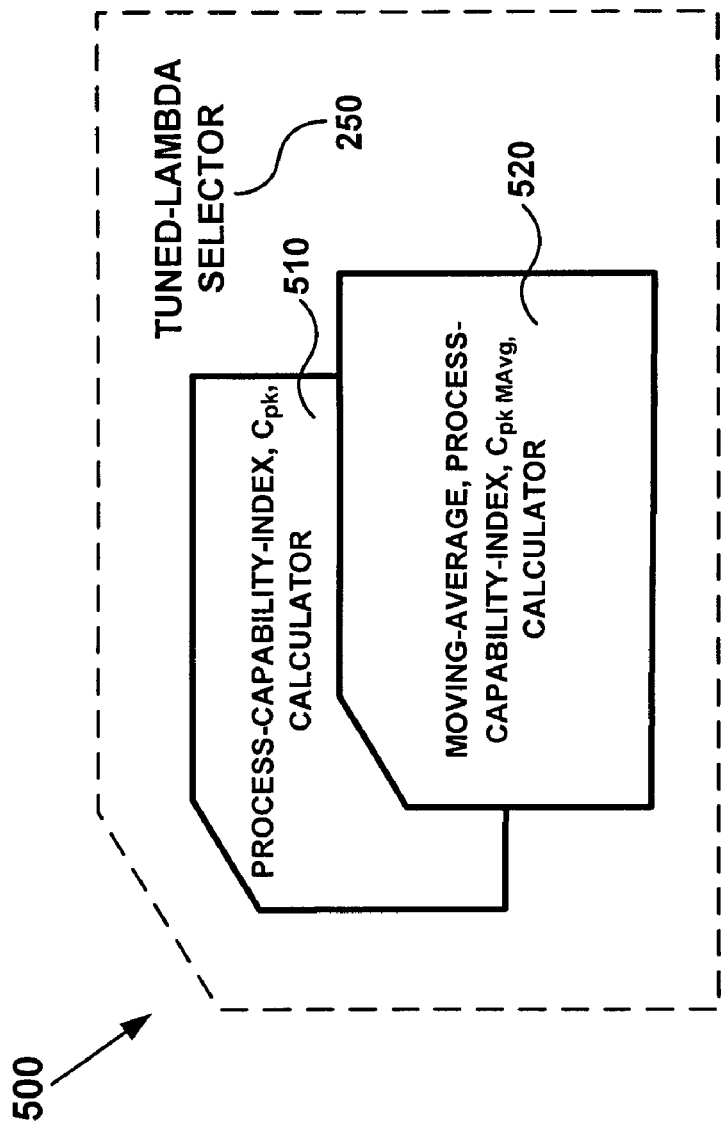
FIG. 5 is schematic diagram illustrating component blocks of a tuned-lambda selector for an embodiment of the present invention.

With reference to FIG. 5, in accordance with an embodiment of the present invention 500, the tuned-lambda selector 250 further comprises various component modules: a process-capability-index, $C_{pk}$, calculator 510, and a moving-average, process-capability-index, $C_{pk\ MAvg}$, calculator 520. The process-capability-index, $C_{pk}$, calculator 510 calculates the statistics from the process-equipment-output values, $y^*_{ij}$, and also calculates the process-capability-index value, $C_{pk\ i}$, from the statistics as a function of the lambda value, $\lambda_i$. The tuned-lambda selector 250 selects as the tuned-lambda value, $\lambda_{TUNED}$, a selected lambda value, $\lambda_{i\ S}$, corresponding to a selected process-capability-index value, $C_{pk\ S}$, in a plurality of the process-capability-index values, $C_{pk\ i}$. The moving-average, process-capability-index, $C_{pk\ MAvg}$, calculator 520 calculates moving-average, process-capability-index values, $C_{pk\ MAvg\ i}$, from the process-capability-index values, $C_{pk\ i}$, to smooth out variations in the process-capability-index values, $C_{pk\ i}$. The tuned-lambda selector 250 selects as the tuned-lambda value, $\lambda_{TUNED}$, a selected lambda value, $\lambda_{i\ S}$, corresponding to a selected moving-average, process-capability-index value, $C_{pk\ MAvg\ S}$, in a plurality of the moving-average, process-capability-index values, $C_{pk\ MAvg\ i}$.

With reference to FIG. 5, in accordance with the embodiment of the present invention 500, the process-capability-index, $C_{pk}$, calculator 510 calculates statistics comprising process-equipment-output, mean values, $u_{yi}$, and process-equipment-output, standard-deviation values, $\sigma_{yi}$, from the process-equipment-output values, $y^*_{ij}$, as a function of the lambda value, $\lambda_i$. The process-capability-index, $C_{pk}$, calculator 510 also calculates the process-capability-index value, $C_{pk\ i}$, from the statistics as a function of the lambda value, $\lambda_i$. The process-capability-index values, $C_{pk\ i}$, are given by:

$$C_{pk\ i} = \min\{UCL-\mu_{yi}, \mu_{yi}-LCL\}/3\sigma_{yi}$$

wherein UCL is an upper control limit, and LCL is a lower control limit for process-equipment-output values.

Figure 6:
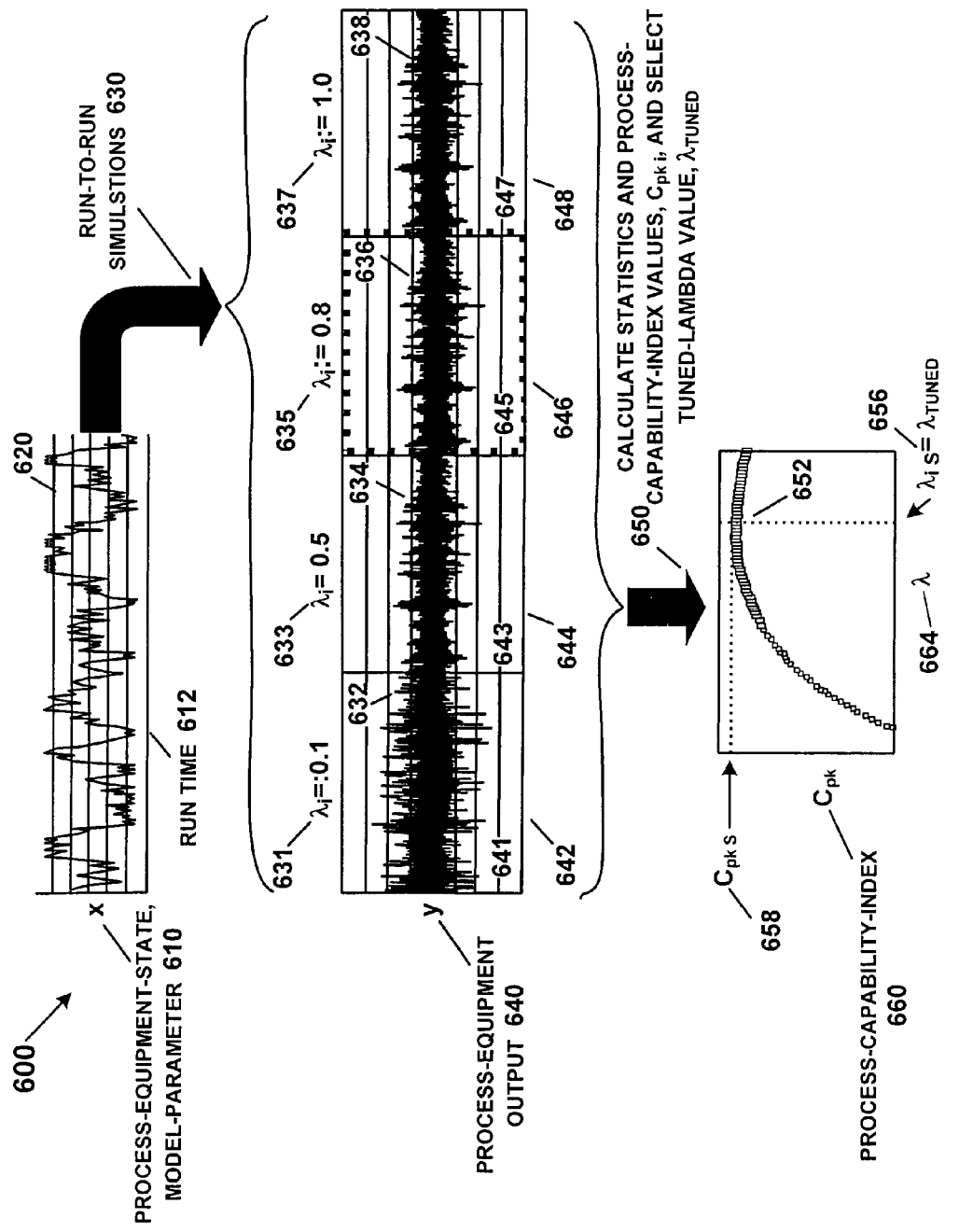
FIG. 6 is schematic diagram illustrating an example of information flow and manipulation to produce a tuned-lambda value for an embodiment of the present invention.

With reference to FIG. 6, in accordance with an embodiment of the present invention 600, a schematic diagram is shown illustrating an example of information flow and manipulation to produce a tuned-lambda value, $\lambda_{TUNED}$. For example, process data in the form of true process-equipment-state, model-parameter values, $x_j^{TRUE}$, 620 are input into the run-to-run simulator 240. This process data can be selected from various sources as described above in response to the simulation-mode selection command sent by the strategy controller 140. The process data chosen will also depend on the process-equipment model used to model the output from the process-equipment tool, e.g. process-equipment tool #1 160, as measured by the measurement tool, e.g. measurement tool #1 180, in response to the process-equipment-model selection command sent by the strategy controller 140. Thus, for another process-equipment model other process data such as the true process-equipment-disturbance, model-parameter values, $v_j^{TRUE}$, may also be input into the run-to-run simulator 240. For the sake of simplifying the description, as shown in FIG. 6, only the true process-equipment-state, model-parameter values, $x_j^{TRUE}$, 620 are shown; the true process-equipment-state, model-parameter values, $x_j^{TRUE}$, 620 appear as a series of fluctuating values in the process-equipment-state, model parameter, x, 610 as a function of run time 612. Run-to-run simulations 630 are executed, as described above with reference to the instruction sets described in FIGS. 3A, 3B, 4A and 4B, using the true process-equipment-state, model-parameter values, $x_j^{TRUE}$, 620 and other data input from the least-squares estimator 210, and the model-parameter calculator 230. In executing these instructions, a series of process-equipment-output values, $y^*_{ij}$, 632, 634, 636 and 638 are generated by the run-to-run simulator 240 as a function of lambda value, $\lambda_i$.

With further reference to FIG. 6, in accordance with the embodiment of the present invention 600, as an example of data generated by the run-to-run simulator 240 in run-to-run simulations 630, process-equipment-output values, $y^*_{ij}$, 632, 634, 636, and 638 are shown as a series of fluctuating values in the process-equipment output, y, 640 as a function of run time 642, 644, 646, and 648, respectively. As shown in FIG. 6, there are four sets of process-equipment-output values, $y^*_{ij}$, 641, 643, 645, and 647 that correspond to four lambda values: $\lambda_i$=0.1, $\lambda_i$=0.5, $\lambda_i$=0.8, $\lambda_i$=1.0, 631, 633, 635, and 637, respectively. Thus, to each lambda value, $\lambda_i$, there is a corresponding set of process-equipment-output values, $y^*_{ij}$. It should be recognized that depending on the lambda value, $\lambda_i$, there is greater or lesser variation in the fluctuating values in the process-equipment output values, $y^*_{ij}$, 632, 634, 636, and 638. In particular, the set 645 of lambda value, $\lambda_i$: $\lambda_i$=0.8, 635 is highlighted in the dashed box as having the least variation. This illustrates the effect of the EWMA filter in reducing variation in the process-equipment output values, $y^*_{ij}$, generally, as a function of the lambda value, $\lambda_i$.

With further reference to FIG. 6, in accordance with the embodiment of the present invention 600, the tuned-lambda selector 250 is used to execute instructions, as described above, 650 to calculate statistics and the process-capability-index values, $C_{pk\ i}$, and select the tuned-lambda value, $\lambda_{TUNED}$. As shown in FIG. 6, process-capability-index values, $C_{pk\ i}$, 652, appear as a series of fluctuating values in a process-capability-index, $C_{pk}$, 660, as a function of lambda, $\lambda$, 664. A selected process-capability-index value, $C_{pk\ S}$, 658 is chosen at about the peak of the process-capability-index values, $C_{pk\ i}$, 652, as shown. From all the lambda values, $\lambda_i$, a selected lambda value, $\lambda_{i\ S}$, corresponds to this selected process-capability-index value, $C_{pk\ S}$, 658, as indicated by the dotted vertical line; this selected lambda value, $\lambda_{i\ S}$, 656 is selected as the tuned-lambda value, $\lambda_{TUNED}$. As seen in FIG. 6, because of the relatively flat top of the curve representing the process-capability-index values, $C_{pk\ i}$, 652, there is a range of values of process-capability-index values, $C_{pk\ i}$, 652 on this portion of the curve from which the selected process-capability-index value, $C_{pk\ S}$, 658 might be chosen. It should be recognized that a selected process-capability-index value, $C_{pk\ S}$, selected within such a range of values and a tuned-lambda value, $\lambda_{TUNED}$, resulting from such a selection of a selected process-capability-index value, $C_{pk\ S}$, within this range are within the spirit and scope of embodiments of the present invention.

Figure 7:
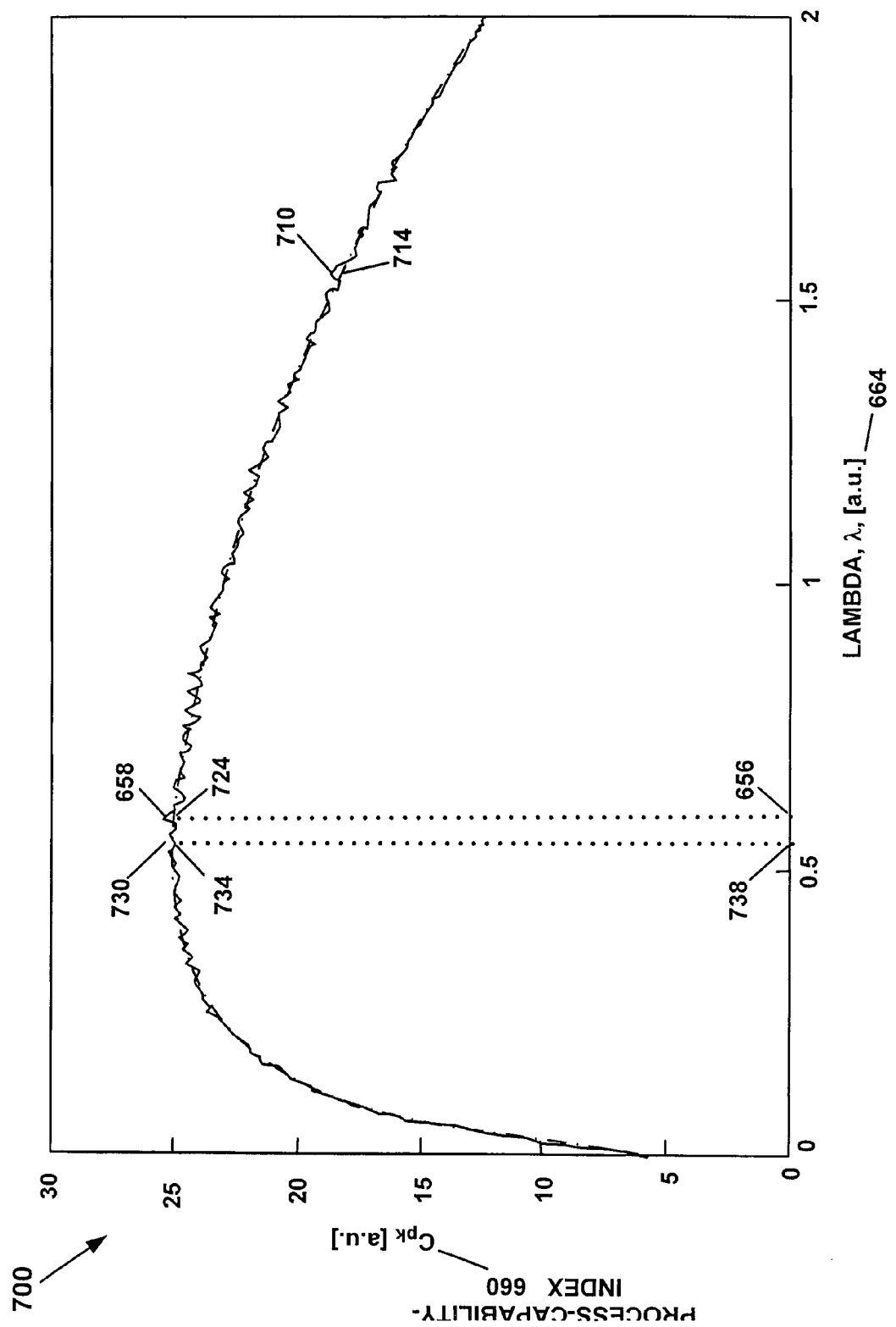
FIG. 7 is a plot illustrating the selection of a tuned-lambda value corresponding to a peak in the process-capability-index values and the moving-average, process-capability-index values.

With reference now to FIG. 7 in accordance with an embodiment of the present invention 700, a plot of the process-capability index, $C_{pk}$, 660 as a function of lambda, $\lambda$, 664 is shown in greater detail. FIG. 7 illustrates the selection of a first tuned-lambda value, $\lambda_{TUNED}$, corresponding to a peak in the process-capability-index values, $C_{pk\ i}$, in contrast to the selection of a second tuned-lambda value, $\lambda_{TUNED}$, corresponding to a peak in the moving-average, process-capability-index values, $C_{pk\ MAvg\ i}$. A process-capability-index curve 710 is shown comprising a series of process-capability-index values, $C_{pk\ i}$, as a function of lambda, $\lambda$, 664 fluctuating about a moving-average, process-capability-index curve 714 comprising a series of moving-average, process-capability-index values, $C_{pk\ MAvg\ i}$, as a function of lambda, $\lambda$, 664. The moving-average, process-capability-index curve 714 is obtained by taking the average value of process-capability-index values, $C_{pk\ i}$, over some range of lambda values, $\lambda_i$, around a central lambda value and plotting that average as a function of the central lambda value. The moving-average, process-capability-index curve 714 smoothes out the fluctuations in the values of the process-capability index, $C_{pk}$, 660.

With further reference to FIG. 7 in accordance with the embodiment of the present invention 700, the first tuned-lambda value, $\lambda_{TUNED}$, corresponds to a first selected lambda value, $\lambda_{i\ S}$, 656 corresponding to a selected process-capability-index value, $C_{pk\ S}$, 658 of the peak value of the process-capability-index values, $C_{pk\ i}$. It should be appreciated that a first moving-average, process-capability-index value 724 corresponding to the selected process-capability-index value, $C_{pk\ S}$, 658 is somewhat less than the selected process-capability-index value, $C_{pk\ S}$, 658, because the process-capability-index values, $C_{pk\ i}$, from which it is selected exhibit statistical fluctuations. These statistical fluctuations raise the concern that the first selected lambda value, $\lambda_{i\ S}$, 656 may not correspond to the true peak of the process-capability index, $C_{pk}$, 660. On the other hand, a second tuned-lambda value, $\lambda_{TUNED}$, corresponds to a selected lambda value, $\lambda_{i\ S}$, 738 corresponding to a selected moving-average, process-capability-index value, $C_{pk\ MAvg\ S}$, 734 of the peak value of moving-average, process-capability-index values, $C_{pk\ MAvg\ i}$. It should be appreciated that the selected moving-average, process-capability-index value, $C_{pk\ MAvg\ S}$, 734 is about equal to a second process-capability-index values, $C_{pk\ i}$, 730, although both are less than the selected process-capability-index value, $C_{pk\ S}$, 658. However, the second selected lambda value, $\lambda_{i\ S}$, 738 corresponding to the selected moving-average, process-capability-index value, $C_{pk\ MAvg\ S}$, 734 is a better estimate for the tuned-lambda value, $\lambda_{TUNED}$, being less susceptible to errors due to statistical fluctuations in the process-capability-index values, $C_{pk\ i}$.

Figure 8:
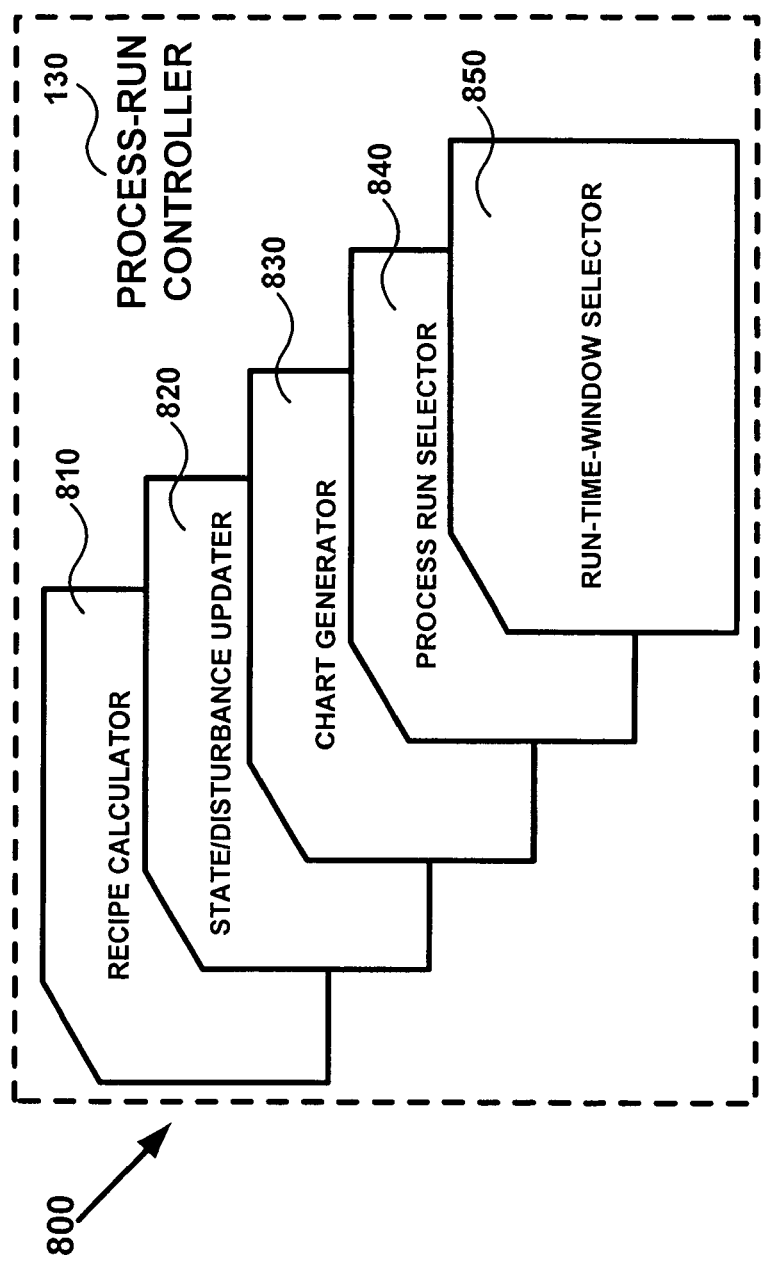
FIG. 8 is schematic diagram illustrating component blocks of a process-run controller for an embodiment of the present invention.

With reference now to FIG. 8 in accordance with an embodiment of the present invention 800, a schematic diagram illustrates component blocks of the process-run controller 130. The process-run controller 130 comprises a recipe calculator 810, state/disturbance updater 820, a chart generator 830, a process-run selector 840, and a run-time-window selector 850. Although these component modules are shown as component modules of the process-run controller 130, it should be recognized that their accessibility by other component blocks of the APC system 104, and even the incorporation of these component modules into other component blocks of the APC system 104 or their embodiment as separate independent component blocks of the APC system 104 are not precluded by the embodiment of the invention shown in FIG. 8. Rather, as for a mode of implementation of embodiments of the present invention as programmable instructions of a computer system, these component modules may be located in various modules of a computer system, or even distributed amongst various modules of a computer system configured to execute those programmable instructions, as is well known from the computer art. Thus, it should be recognized that the schematic representation shown in FIG. 8 does not preclude embodiments of the present invention in hardware, software, firmware or any combination thereof.

With further reference to FIG. 8 in accordance with the embodiment of the present invention 800, the recipe calculator 810 receives the tuned-lambda value, $\lambda_{TUNED}$, from the lambda tuner 120 sent to the process-run controller 130 to calculate a recipe value, $u_{OUT}$, based on the recipe model and the process-equipment-output target value, $y^{TARGET}$, received from the strategy controller 140. The recipe value, $u_{OUT}$, is then output to a process-equipment tool to control a true process run. The state/disturbance updater 820 performs essentially the same function as the model-parameter calculator 230; the state/disturbance updater 820 may be used in a data referencing mode using actual process data to determine the true process-equipment-state, model-parameter values, $x_i^{TRUE}$, and the true process-equipment-disturbance, model-parameter values, $v_i^{TRUE}$, that are derived from true process-equipment output values, $y_i^{TRUE}$. The true process-equipment-state, model-parameter values, $x_i^{TRUE}$, and the true process-equipment-disturbance, model-parameter values, $v_i^{TRUE}$, are used in calculating the recipe value, $u_{OUT}$, with the recipe calculator 810. The chart generator 830 sends process-data information and control-chart information to the strategy controller 140.

Figure 9:
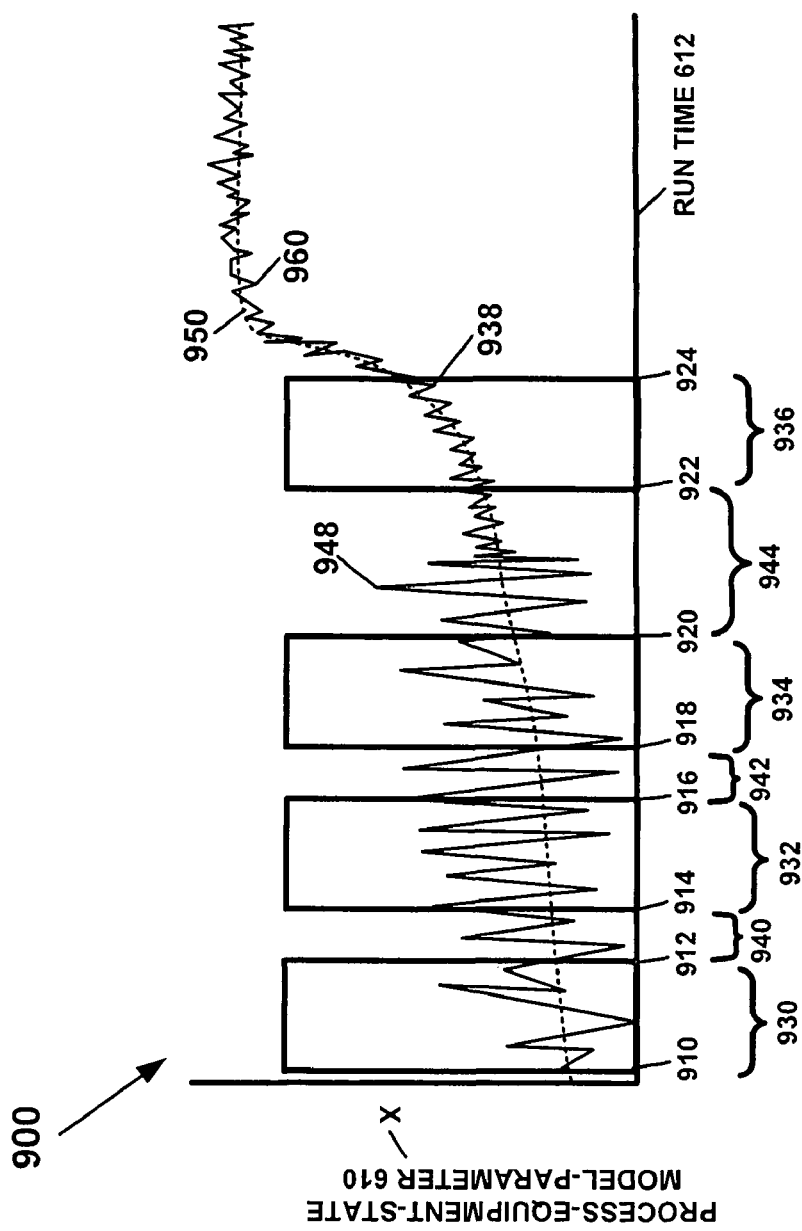
FIG. 9 is a plot illustrating selection of process data within a run-time-window and selection of a run-time window amongst a plurality of run-time windows separated by inter-window intervals having various widths.

With reference now to FIG. 9 in accordance with an embodiment of the present invention 900, the operation of the process-run selector 840 and the run-time-window selector 850 are next described. The process-run selector 840, and the run-time-window selector 850 provide a means of selecting process data for the run-to-run simulator 240 and other component blocks of the APC system 104 that require such process data. A plot of the process-equipment-state, model parameter, x, 610 as a function of run time 612 is shown. Four successive run-time windows 930, 932, 934 and 936 in a plurality of run-time windows 930, 932, 934 and 936 are shown. An example of a true process-equipment-state, model-parameter value, $x_i^{TRUE}$, 938 corresponding to process data from a process run within the run-time window 936 is shown. The run-time-window width of window 930 spans the range of successive run times between 910 and 912; similarly, run-time-window widths of windows 932, 934 and 936 span the range of successive run times between 914 and 916, 918 and 920, and 922 and 924, respectively. Two successive run-time windows, e.g. 930 and 932, are separated by an inter-window interval, e.g. 940. Three successive inter-window intervals are shown 940, 942 and 944. An example of a true process-equipment-state, model-parameter value, $x_i^{TRUE}$, 948 corresponding to process data from a process run within the inter-window interval 944 is shown. The inter-window-interval width of inter-window interval 940 spans the range of successive run times between 912 and 914; similarly, inter-window-interval widths of windows 942 and 944 span the range of successive run times between 916 and 918, and 920 and 922, respectively. A process run having corresponding process-run data, e.g. values of the process-equipment-state, model parameter, x, 610 corresponds to each run time within the run-time windows and inter-window intervals as shown. It should be recognized that the width of a run-time window, e.g. 930, is adjustable, e.g. by changing the number of process runs between 910 and 912, which may be done by moving the locations of 910 and 912 to the left or right along the abscissa axis shown, and that the width of the inter-window interval, e.g. 940, is adjustable, e.g. by changing the number of process runs between 912 and 914 to the left or right along the abscissa axis shown.

With further reference to FIG. 9 in accordance with the embodiment of the present invention 900, the process-run selector 840 is accessible to the lambda tuner 120 and the process-run controller 130 for selecting a plurality of process runs spanning a run-time window, e.g. 930. The run-time window, e.g. 930, comprises an adjustable run-time-window width spanning a range of successive run times, e.g. run times between 912 and 914. The run-time-window selector 850 is accessible to the lambda tuner 120 and the process-run controller 130 for selecting the run-time window, e.g. 930, from a plurality of run-time windows. The run-time window, e.g. 930, in the plurality of run-time windows is separated from an adjacent run-time window, e.g. 932, in the plurality of run-time windows by an inter-window interval, e.g. 940. The inter-window interval, e.g. 940, comprises an adjustable inter-window-interval width spanning a range of successive run times between the run-time window, e.g. 930, and the adjacent run-time window, e.g. 932.

With further reference to FIG. 9 in accordance with the embodiment of the present invention 900, a process-equipment-state, model-parameter curve 960 comprising a series of true process-equipment-state, model-parameter values, $x_i^{TRUE}$, as a function of run time is shown. Also, the trend line 950 corresponding to the process-equipment-state, model-parameter curve 960 is shown. The width of the run-time window determines the number of process runs to be used in the run-to-run simulation. The width is adjusted according to the variation of values of true process data: process-equipment-state, model parameter, x; process-equipment-disturbance, model parameter, v; or process-equipment output, y. The width of the run-time window is chosen to be large corresponding to a large number of process runs when changes in the true process data are slow, e.g. when only slight variations in the trend line 950 occur; and, the width of the run-time window is chosen to be small corresponding to a low number of process runs when changes in the true process data are fast, e.g. when large variations in the trend line 950 occur.

Figure 10:
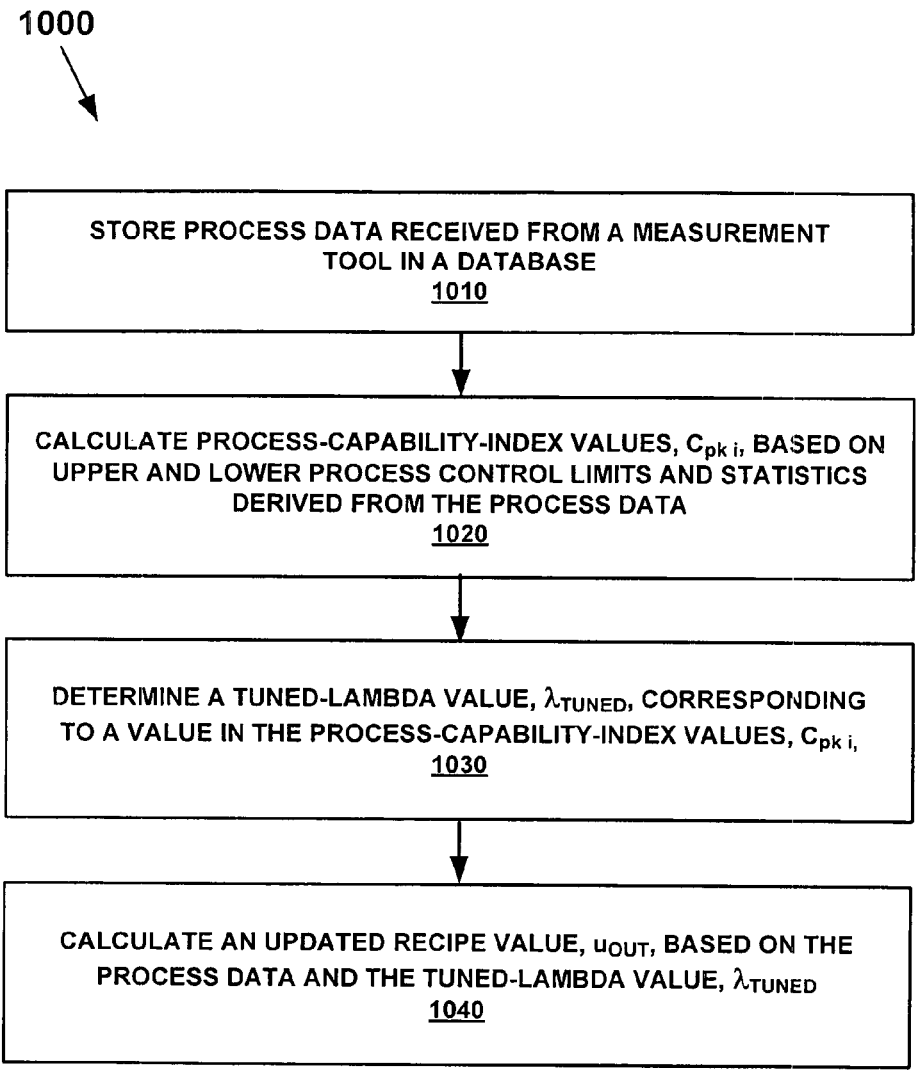
FIG. 10 is a flow chart illustrating an embodiment of the present invention to a method for advanced process control utilizing a tuned-lambda value based on a process-capability-index.
Figure 11:
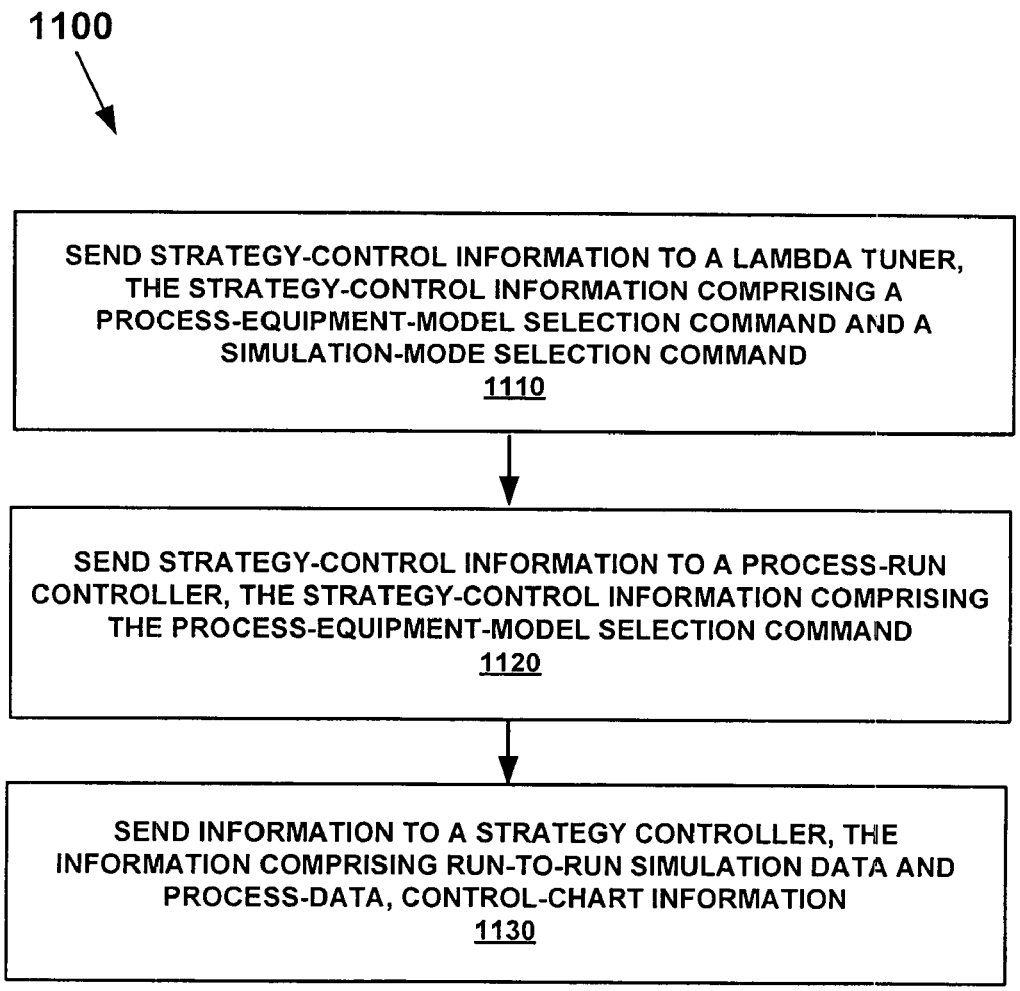
FIG. 11 is a flow chart illustrating an embodiment of the present invention incorporating strategy control of the method for advanced process control.

Description of Embodiments of the Present Invention for a Method for an Advanced Process control System With reference now to FIG. 10, a flow chart illustrates an embodiment of the present invention 1000 for a method for advanced process control. The method for advanced process control comprises four instructions: 1010, 1020, 1030 and 1040. 1010, store process data received from a measurement tool, e.g. measurement tool #1 180, in a database 110. 1020, calculate process-capability-index values based on upper and lower process control limits and statistics derived from the process data. 1030, determine a tuned-lambda value corresponding to a value in the process-capability-index values. 1040 calculate an updated recipe value based on the process data and the tuned-lambda value. It should be appreciated that "1040" includes the case that a recipe value is updated based on the process data and model parameters estimated with the tuned-lambda value.

With reference to FIG. 1, a flow chart illustrates an embodiment of the present invention 1100 for incorporating strategy control of the method for advanced process control. The method for advanced process control further comprises three instructions: 1110, 1120 and 1130. 1110, send strategy-control information to a lambda tuner 120, the strategy-control information comprising a process-equipment-model selection command and a simulation-mode selection command. 1120, send strategy-control information to a process-run controller 130, the strategy-control information comprising the process-equipment-model selection command. 1130, send information to a strategy controller 140, the information comprising run-to-run simulation data and process-data, control-chart information.

Figure 12:
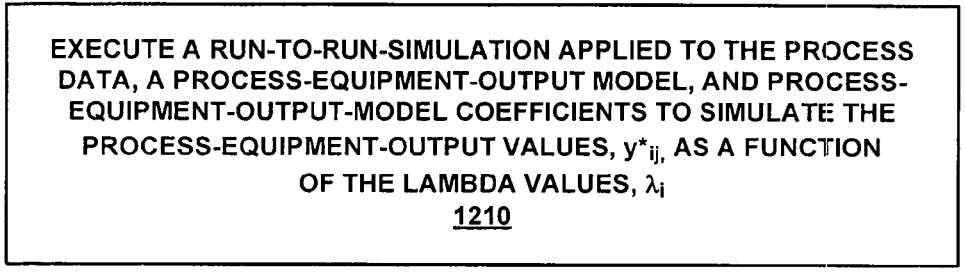
FIG. 12 is a flow chart illustrating an embodiment of the present invention for executing a run-to-run simulation of the method for advanced process control.

With reference to FIG. 12, a flow chart illustrates an embodiment of the present invention 1200 for executing a run-to-run simulation of the method for advanced process control. The method for advanced process control further comprises an instruction, 1210. 1210, execute a run-to-run-simulation applied to the process data, a process-equipment-output model, and process-equipment-model coefficients for simulating the process-equipment-output values as a function of lambda values.

With reference to FIG. 13, a flow chart illustrates an embodiment of the present invention 1300 for calculate a tuned-lambda-value of the method for advanced process control. The method for advanced process control further comprises two instructions: 1310 and 1320. 1310, calculate the statistics from the process-equipment-output values and calculate the process-capability-index values from the statistics as a function of the lambda values. 1320, select as the tuned-lambda value a selected lambda value corresponding to a selected process-capability-index value in a plurality of the process-capability-index values.

Figure 14:
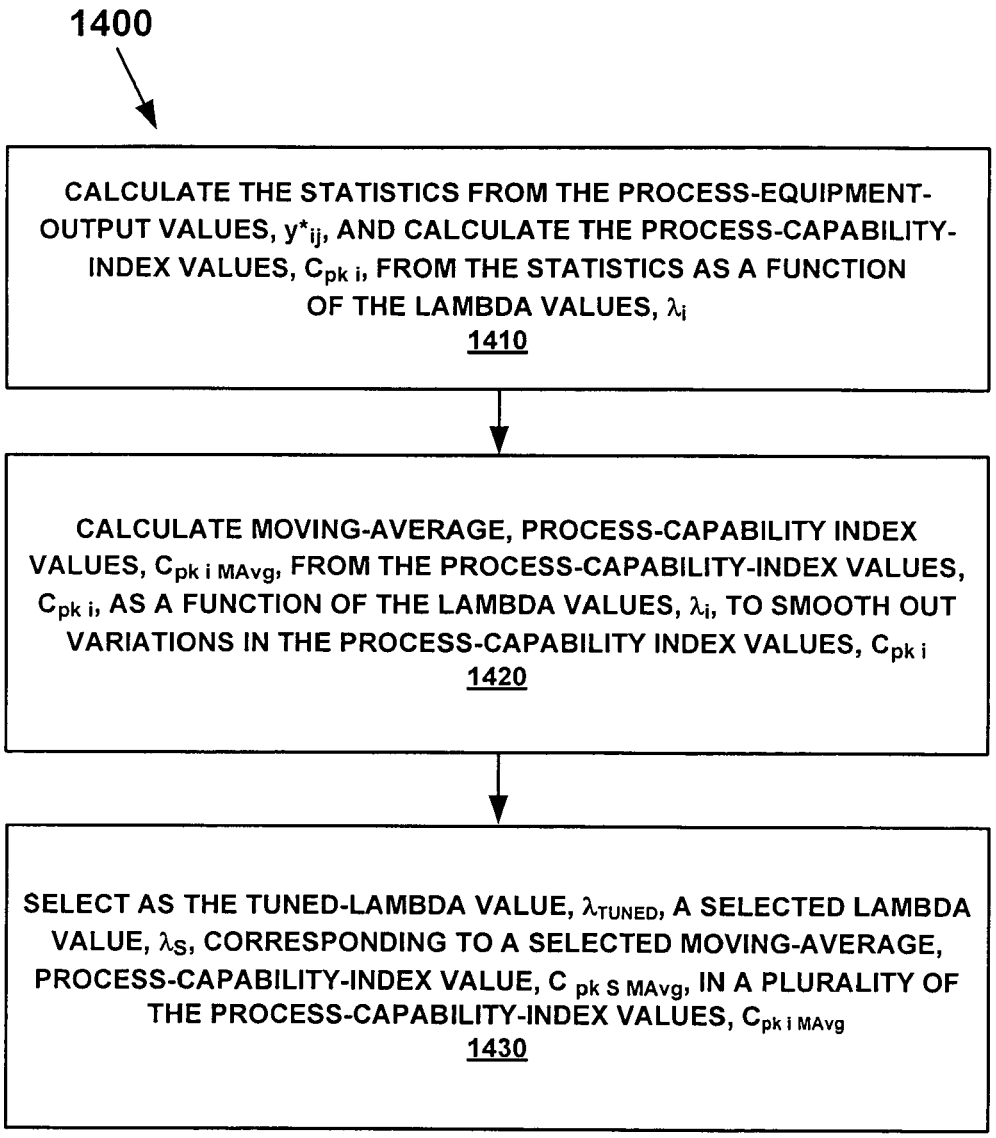
FIG. 14 is a flow chart illustrating an embodiment of the present invention for calculating a tuned-lambda-value based on a moving-average, process-capability-index of the method for advanced process control.

With reference to FIG. 14, a flow chart illustrates an embodiment of the present invention 1400 for calculate a tuned-lambda-value based on a moving-average, process-capability-index of the method for advanced process control. The method for advanced process control further comprises three instructions: 1410, 1420 and 1430. 1410, calculate the statistics from the process-equipment-output values and calculate the process-capability-index values from the statistics as a function of the lambda values. 1420, calculate moving-average, process-capability-index values from the process-capability-index values as a function of the lambda values to smooth out variations in the process-capability-index values. 1430, select as the tuned-lambda value a selected lambda value corresponding to a selected moving-average, process-capability-index value in a plurality of the moving-average, process-capability-index values.

Figure 15:
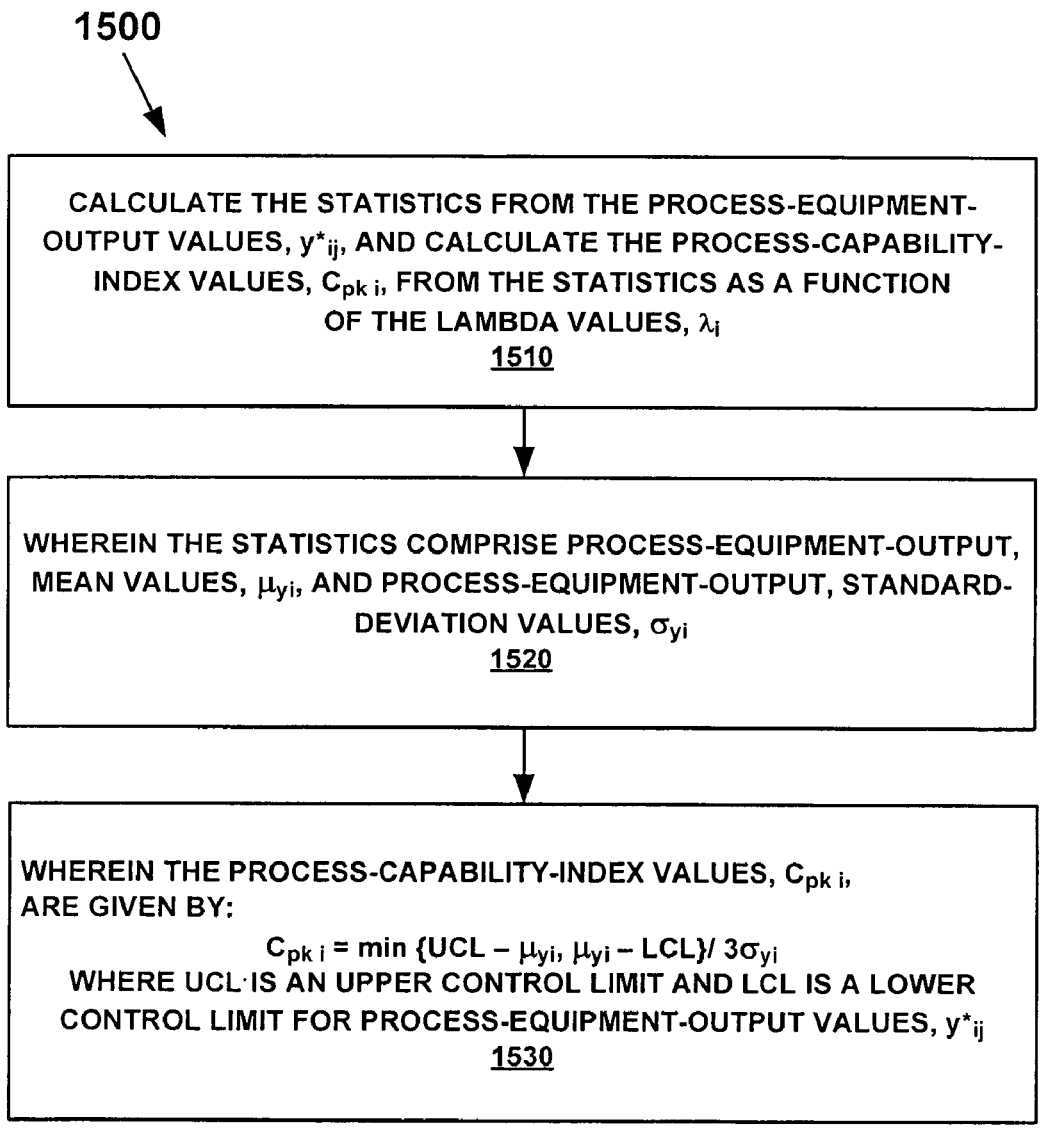
FIG. 15 is a flow chart illustrating an embodiment of the present invention for calculating a process-capability-index-value of the method for advanced process control.

With reference to FIG. 15, a flow chart illustrates an embodiment of the present invention 1500 for calculating a process-capability-index-value of the method for advanced process control. The method for advanced process control further comprises three instructions: 1510, 1520 and 1530. 1510, calculate the statistics from the process-equipment-output values, and calculate the process-capability-index values from the statistics as a function of the lambda values. 1520, the statistics comprise process-equipment-output, mean values, $\mu_{yi}$, and process-equipment-output, standard-deviation values, $\sigma_{yi}$. 1530, the process-capability-index values, $C_{pk\ i}$, are given by:

$$C_{pk\ i} = \min\{UCL - \mu_{yi},\ \mu_{yi} - LCL\}/3\sigma_{yi}$$

wherein UCL is an upper control limit, and LCL is a lower control limit for process-equipment-output values.

Figure 16:
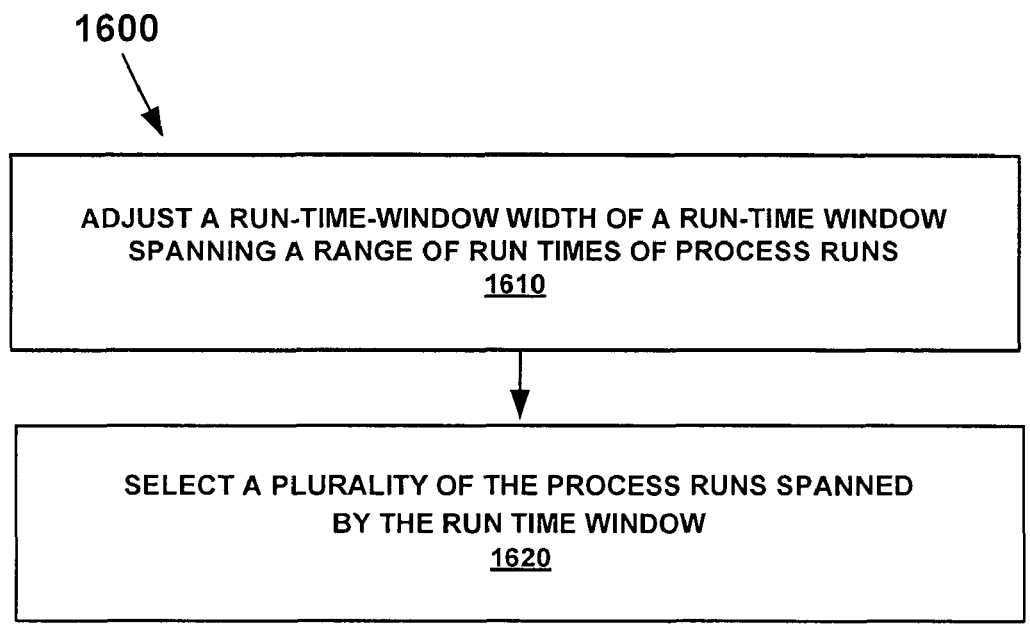
FIG. 16 is a flow chart illustrating an embodiment of the present invention for selecting process data within a run-time-window of the method for advanced process control.

With reference to FIG. 16, a flow chart illustrates an embodiment of the present invention 1600 for selecting process data within a run-time-window of the method for advanced process control. The method for advanced process control further comprises two instructions: 1610 and 1620. 1610, adjust a run-time-window width of a run-time window spanning a range of run times of process runs. 1620, select a plurality of the actual process runs spanned by the run-time window.

Figure 17:
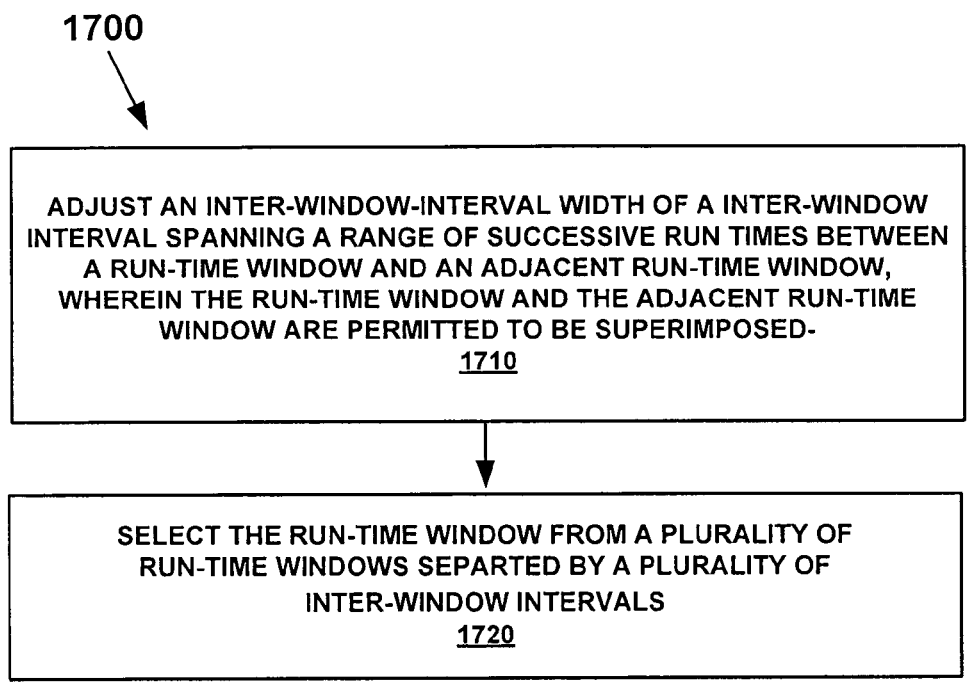
FIG. 17 is a flow chart illustrating an embodiment of the present invention for selecting a run-time window amongst a plurality of run-time windows separated by inter-window intervals of the method for advanced process control.

With reference to FIG. 17, a flow chart illustrates an embodiment of the present invention 1700 for selecting a run-time window amongst a plurality of run-time windows separated by inter-window intervals of the method for advanced process control. The method for advanced process control further comprises two instructions: 1710 and 1720. 1710, adjust an inter-window-interval width of an inter-window interval spanning a range of successive run times between a run-time window and an adjacent run-time window, wherein the run-time window and the adjacent run-time window are permitted to be superimposed. 1720, select the run-time window from a plurality of run-time windows separated by a plurality of inter-window intervals.

With reference to FIG. 18, a flow chart illustrates an embodiment of the present invention 1800 synthesizing synthetic process data of the method for advanced process control. The method for advanced process control further comprises one instruction, 1810. 1810, synthesize synthetic process data comprising a waveform as a function of run time selected from the group of waveforms consisting of: a ramp, independently and identically distributed data, brown noise, a periodically repeating step, a sine wave, a periodically repeating impulse, a sawtooth, and a constant level.

Description of Embodiments of the Present Invention for an Article of Manufacture Comprising a Program Storage Medium Readable by Computer, the Medium Tangibly Embodying a Program of Instructions Executable by the Computer to Perform a Method for Advanced Process Control Another embodiment of the present invention may be an article of manufacture comprising a program storage medium readable by a computer, the medium tangibly embodying a program of instructions executable by the computer to perform a method for advanced process control. With reference to FIG. 10, the program of instructions executable by the computer to perform a method for advanced process control comprises four instructions: 1010, 1020, 1030 and 1040. 1010, store process data received from a measurement tool, e.g. measurement tool #1 180, in a database 110. 1020, calculate process-capability-index values based on upper and lower process control limits and statistics derived from the process data. 1030, determine a tuned-lambda value corresponding to a value in the process-capability-index values calculate an updated recipe value based on the process data and the tuned-lambda value.

It should be appreciated that the article of manufacture comprising the program storage medium readable by the computer, which tangibly embodies the program of instructions, may be: a magnetic-recording disk, a compact disk, a magneto-optical disk, a magnetic-recording tape, or an electronic memory device such as a flash memory. Moreover, it should be further appreciated that a program of instructions tangibly embodied in hardware, software, firmware or any combination thereof are within the scope and spirit of embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An advanced-process-control system, comprising:
a database for receiving process data from a measurement tool for a plurality of process runs and for storing said process data;
a lambda tuner for determining a tuned-lambda value corresponding to a process-capability-index value based on upper and lower process control limits and statistics derived from said process data; and
a process-run controller for updating a recipe value based on said process data and said tuned-lambda value;
wherein said lambda tuner further comprises:
a run-to-run simulator for simulating process-equipment-output values, said run-to-run simulator applied to said process data, a process-equipment-output model, and process-equipment-model coefficients for simulating said process-equipment-output values, and for providing to said lambda tuner a plurality of lambda values and corresponding process-equipment-output values for a plurality of simulated process runs;
wherein said lambda tuner further comprises:
a tuned-lambda selector for selecting said tuned-lambda value, said tuned-lambda selector comprising:
a process-capability-index calculator for calculating said statistics from said process-equipment-output values, and for calculating said process-capability-index value from said statistics as a function of said lambda value; and
a moving-average, process-capability-index calculator for calculating moving-average, process-capability-index values from said process-capability-index values to smooth out variations in said process-capability-index values, said tuned-lambda selector for selecting as said tuned-lambda value a selected lambda value corresponding to a selected moving-average, process-capability-index value in a plurality of said moving-average, process-capability-index values.

2. The advanced-process-control system according to claim 1, further comprising:
a strategy controller for sending strategy-control information to said lambda tuner and said process-run controller, said strategy-control information comprising a process-equipment-model selection command and a simulation-mode selection command.

3. The advanced-process-control system according to claim 2, wherein said strategy controller further comprises a human-machine interface to said advanced-process-control system for receiving instructions to send said strategy-control information to said lambda tuner and said process-run controller and for communicating information sent from said lambda tuner and said process-run controller.

4. The advanced-process-control system according to claim 1, wherein said lambda tuner further comprises:
a tuned-lambda selector for selecting said tuned-lambda value, said tuned-lambda selector comprising:
a process-capability-index calculator for calculating said statistics from said process-equipment-output values, and for calculating said process-capability-index value from said statistics as a function of said lambda value, said tuned-lambda selector for selecting as said tuned-lambda value a selected lambda value corresponding to a selected process-capability-index value in a plurality of said process-capability-index values.

5. The advanced-process-control system according to claim 1, wherein said lambda tuner further comprises:
a tuned-lambda selector for selecting said tuned-lambda value, said tuned-lambda selector comprising:
a process-capability-index calculator for calculating said statistics from said process-equipment-output values, and for calculating said process-capability-index values from said statistics as a function of said lambda values;
wherein said statistics comprise process-equipment-output, mean values, $\mu_{y,i}$, and process-equipment-output, standard-deviation values, $\sigma_{y,i}$; and
wherein said process-capability-index values, $C_{pk\ i}$, are given by:

$$C_{pk\ i} = \min\{UCL - \mu_{y,i}, \mu_{y,i} - LCL\}/3\sigma_{y,i}$$

wherein UCL is an upper control limit, and LCL is a lower control limit for process-equipment-output values.

6. The advanced-process-control system according to claim 1, further comprising:
a process-run selector accessible to said lambda tuner and said process-run controller for selecting a plurality of process runs spanning a run-time window, said run-time window comprising an adjustable run-time-window width spanning a range of successive run times.

7. The advanced-process-control system according to claim 1, further comprising:
a run-time-window selector accessible to said lambda tuner and said process-run controller for selecting a run-time window from a plurality of run-time windows, said run-time window in said plurality of run-time windows separated from an adjacent run-time window in said plurality of run-time windows by an inter-window interval, said inter-window interval comprising an adjustable inter-window-interval width spanning a range of successive run times between said run-time window and said adjacent run-time window.

8. The advanced-process-control system according to claim 1, wherein said lambda tuner further comprises:
a process-data synthesizer for synthesizing synthetic process data, said synthetic process data comprising a waveform as a function of run time selected from the group of waveforms consisting of: a ramp, independently and identically distributed data, brown noise, a periodically repeating step, a sine wave, a periodically repeating impulse, a sawtooth, and a constant level.

9. A method for advanced process control, comprising:
storing process data received from a measurement tool in a database;
calculating process-capability-index values based on upper and lower process control limits and statistics derived from said process data;
determining a tuned-lambda value corresponding to a value in said process-capability-index values; and
calculating an updated recipe value based on said process data and said tuned-lambda value;
further comprising:
executing a run-to-run-simulation applied to said process data, a process-equipment-output model, and process-equipment-model coefficients for simulating process-equipment-output values as a function of lambda values;
further comprising:
calculating said statistics from said process-equipment-output values and calculating said process-capability-index values from said statistics as a function of said lambda values;
calculating moving-average, process-capability-index values from said process-capability-index values as a function of said lambda values to smooth out variations in said process-capability-index values; and
selecting as said tuned-lambda value a selected lambda value corresponding to a selected moving-average, process-capability-index value in a plurality of said moving-average, process-capability-index values.

10. The method for advanced process control according to claim 9, further comprising:
sending strategy-control information to a lambda tuner, said strategy-control information comprising a process-equipment-model selection command and a simulation-mode selection command;
sending strategy-control information to a process-run controller, said strategy-control information comprising said process-equipment-model selection command; and
sending information to a strategy controller, said information comprising run-to-run simulation data and process-data, control-chart information.

11. The method for advanced process control according to claim 9, further comprising:
calculating said statistics from said process-equipment-output values and calculating said process-capability-index values from said statistics as a function of said lambda values; and
selecting as said tuned-lambda value a selected lambda value corresponding to a selected process-capability-index value in a plurality of said process-capability-index values.

12. The method for advanced process control according to claim 9, further comprising:
calculating said statistics from said process-equipment-output values, and calculating said process-capability-index values from said statistics as a function of said lambda values;
wherein said statistics comprise process-equipment-output, mean values, $\mu_{yi}$, and process-equipment-output, standard-deviation values, $\sigma_{yi}$; and
wherein said process-capability-index values, $C_{pk\ i}$, are given by:
$C_{pk\ i} = \min\{UCL - \mu_{yi}, \mu_{yi} - LCL\}/3\sigma_{yi}$
wherein UCL is an upper control limit, and LCL is a lower control limit for process-equipment-output values.

13. The method for advanced process control according to claim 9, further comprising:
adjusting a run-time-window width of a run-time window spanning a range of run times of process runs; and
selecting a plurality of said process runs spanned by said run-time window.

14. The method for advanced process control according to claim 9, further comprising:
adjusting an inter-window-interval width of an inter-window interval spanning a range of successive run times between a run-time window and an adjacent run-time window, wherein said run-time window and said adjacent run-time window are permitted to be superimposed; and
selecting said run-time window from a plurality of run-time windows separated by a plurality of inter-window intervals.

15. The method for advanced process control according to claim 9, further comprising:
synthesizing synthetic process data comprising a waveform as a function of run time selected from the group of waveforms consisting of: a ramp, independently and identically distributed data, brown noise, a periodically repeating step, a sine wave, a periodically repeating impulse, a sawtooth, and a constant level.

16. An article of manufacture comprising a program storage medium readable by a computer, the medium tangibly embodying a program of instructions executable by the computer to perform a method for advanced process control, comprising:
storing process data received from a measurement tool in a database;
calculating process-capability-index values based on upper and lower process control limits and statistics derived from said process data;
determining a tuned-lambda value corresponding to a value in said process-capability-index values; and
calculating an updated recipe value based on said process data and said tuned-lambda value;
further comprising:

executing a run-to-run-simulation applied to said process data, a process-equipment-output model, and process-equipment-model coefficients for simulating process-equipment-output values as a function of lambda values;

further comprising:

calculating said statistics from said process-equipment-output values and calculating said process-capability-index values from said statistics as a function of said lambda values;

calculating moving-average, process-capability-index values from said process-capability-index values as a function of said lambda values to smooth out variations in said process-capability-index values; and selecting as said tuned-lambda value a selected lambda value corresponding to a selected moving-average, process-capability-index value in a plurality of said moving-average, process-capability-index values.

* * * * *

UNITED STATES PATENT AND TRADEMARK OFFICE
CERTIFICATE OF CORRECTION

PATENT NO. : 7,809,459 B2
APPLICATION NO. : 12/006411
DATED : October 5, 2010
INVENTOR(S) : Toshihiro Morisawa et al.

It is certified that error appears in the above-identified patent and that said Letters Patent is hereby corrected as shown below:

Title page, Item (73)

The Assignee field currently reads "Hitachi Global Technologies, Netherlands B.V."

The Assignee field should read "Hitachi Global Storage Technologies, Netherlands B.V."

Signed and Sealed this
Twenty-ninth Day of March, 2011

David J. Kappos
*Director of the United States Patent and Trademark Office*